US011661735B2

(12) United States Patent
Cosley

(10) Patent No.: US 11,661,735 B2
(45) Date of Patent: May 30, 2023

(54) FIRE STOP FOR A PASSAGEWAY

(71) Applicant: Reliance Worldwide Corporation, Atlanta, GA (US)

(72) Inventor: James W. Cosley, Ramona, CA (US)

(73) Assignee: RELIANCE WORLDWIDE CORPORATION, Atlanta, GA (US)

( * ) Notice: Subject to any disclaimer, the term of this patent is extended or adjusted under 35 U.S.C. 154(b) by 0 days.

(21) Appl. No.: 17/314,257

(22) Filed: May 7, 2021

(65) Prior Publication Data
US 2021/0348382 A1 Nov. 11, 2021

Related U.S. Application Data

(60) Provisional application No. 63/022,240, filed on May 8, 2020.

(51) Int. Cl.
*E04B 1/94* (2006.01)
*E04G 15/06* (2006.01)

(52) U.S. Cl.
CPC .............. *E04B 1/947* (2013.01); *E04B 1/948* (2013.01); *E04G 15/061* (2013.01)

(58) Field of Classification Search
CPC ....... E04B 1/947; E04B 1/948; E04G 15/061; F16L 5/02; F16L 5/04; E04C 2/52; H02G 3/22; H02G 3/0412; A62C 2/065
See application file for complete search history.

(56) References Cited

U.S. PATENT DOCUMENTS

| 4,669,244 | A | * | 6/1987 | Szoke | F16L 5/02 52/220.8 |
|---|---|---|---|---|---|
| 5,020,481 | A | * | 6/1991 | Nelson | F24H 1/182 122/494 |
| 5,032,690 | A | * | 7/1991 | Bloom | H02G 3/22 174/487 |
| 5,070,597 | A | * | 12/1991 | Holt | F16L 5/02 285/97 |
| 5,814,764 | A | * | 9/1998 | Kohaut | H02G 3/22 52/220.8 |
| 5,887,395 | A | * | 3/1999 | Navarro | F16L 5/04 428/920 |
| 5,887,396 | A | * | 3/1999 | Thoreson | A62C 2/065 52/220.8 |
| 5,947,159 | A | * | 9/1999 | Takahashi | F16L 5/04 138/167 |
| 6,029,412 | A | * | 2/2000 | Gohlke | F16L 5/04 137/75 |
| 6,725,615 | B1 | * | 4/2004 | Porter | F16L 5/04 52/99 |

(Continued)

*Primary Examiner* — Gisele D Ford
(74) *Attorney, Agent, or Firm* — Barnes & Thornburg LLP

(57) ABSTRACT

A tubular fire stop assembly for a poured concrete structure defines at least a portion of a passage through the structure during use. The assembly has a base with a tubular sleeve, both encircling and extending along the passage. A fire ring is connected to the base and has a plate with a central opening encircling the passage. An intumescent ring has inner and outer sidewalls and opposing top and bottom walls. The intumescent ring is inside the base, encircles the passage and rests on the fire ring plate. A woven, galvanized wire mesh casing extends along the inner and outer sidewalls and the top wall of the intumescent ring.

16 Claims, 10 Drawing Sheets

(56) References Cited

U.S. PATENT DOCUMENTS

| | | | | |
|---|---|---|---|---|
| 7,596,914 | B2* | 10/2009 | Stahl, Sr. | F16L 5/04 52/220.8 |
| 8,336,832 | B2* | 12/2012 | van Walraven | F16L 5/04 52/220.8 |
| 8,776,462 | B2* | 7/2014 | Foerg | A62C 2/065 52/220.8 |
| 9,086,174 | B2* | 7/2015 | McConnell | E04G 15/061 |
| 2003/0019649 | A1* | 1/2003 | Rubenstein | H02G 3/0666 174/654 |
| 2003/0192269 | A1* | 10/2003 | Radke | H02G 3/0412 52/220.8 |
| 2004/0149390 | A1* | 8/2004 | Monden | F16L 5/04 156/391 |
| 2007/0137876 | A1* | 6/2007 | Miettinen | H02G 3/22 174/50.56 |
| 2007/0151183 | A1* | 7/2007 | Stahl, Sr. | F16L 5/04 52/317 |
| 2008/0078841 | A1* | 4/2008 | Messmer | A62C 2/065 236/49.3 |
| 2008/0135285 | A1* | 6/2008 | Drane | H02G 3/0493 174/483 |
| 2008/0135286 | A1* | 6/2008 | Jolly | H02G 3/185 174/483 |
| 2009/0218130 | A1* | 9/2009 | Monden | F16L 5/04 174/505 |
| 2011/0210222 | A1* | 9/2011 | Van Walraven | A62C 2/06 248/315 |
| 2013/0092251 | A1* | 4/2013 | Munzenberger | F28F 7/00 428/596 |
| 2013/0104475 | A1* | 5/2013 | Foerg | A62C 2/065 52/232 |
| 2015/0121783 | A1* | 5/2015 | McConnell | H02G 3/0412 52/232 |
| 2018/0015314 | A1* | 1/2018 | Muenzenberger | H02G 3/22 |
| 2018/0112803 | A1* | 4/2018 | Muenzenberger | A62C 3/16 |
| 2019/0257082 | A1* | 8/2019 | Brown | F16L 5/04 |

\* cited by examiner

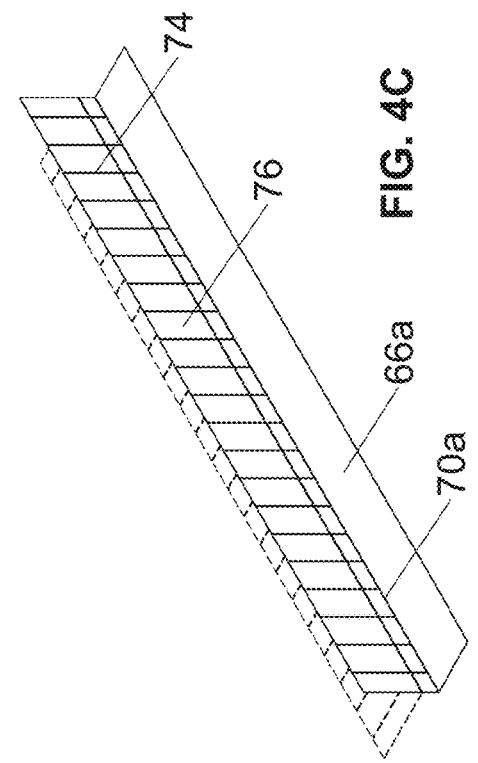
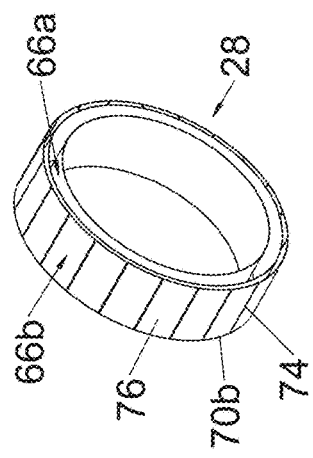
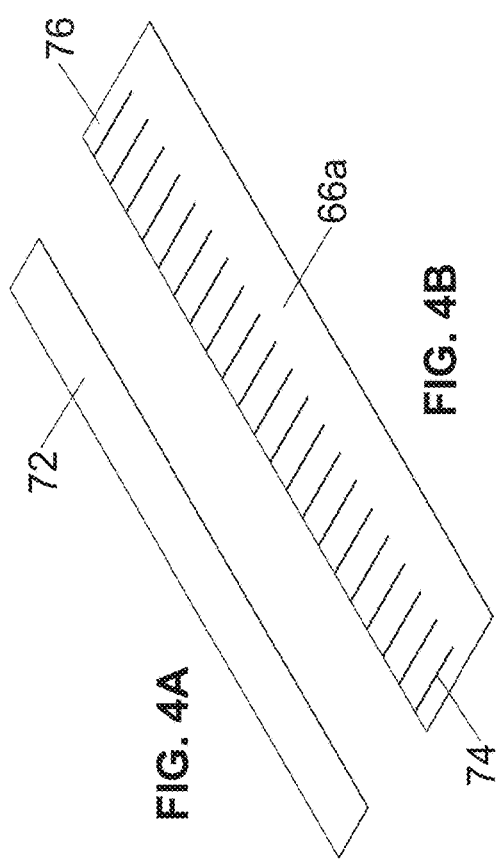
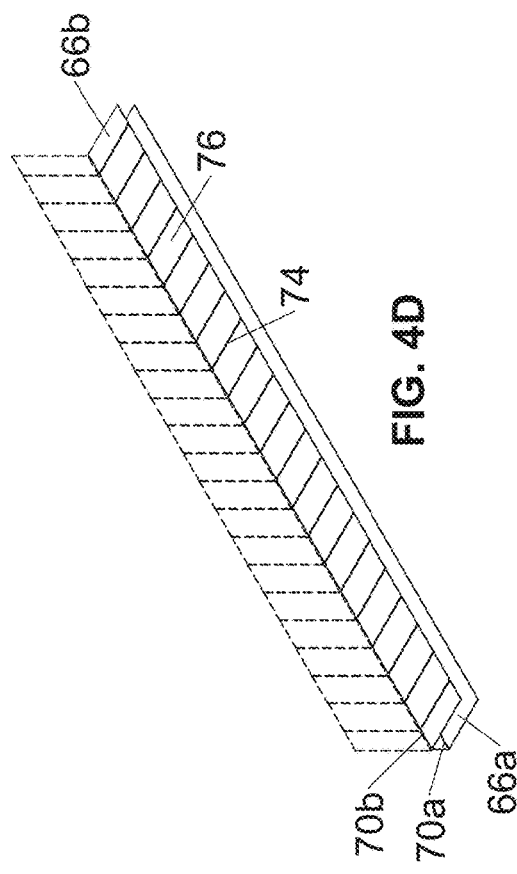

FIRE STOP FOR A PASSAGEWAY

CROSS-REFERENCE TO RELATED APPLICATIONS

This patent application claims priority to U.S. Provisional Patent Application No. 63/022,240 filed on May 8, 2020.

INCORPORATION BY REFERENCE

The contents of U.S. Provisional Patent Application No. 63/022,240 filed on May 8, 2020, are incorporated herein by reference as if set forth in their entirety.

BACKGROUND

This application relates to fire stop assemblies for passages through building walls and floors, typically through poured concrete structures, including but not limited to concrete slabs, such as horizontal floors or decks, vertical walls, beams, columns, etc . . . , and all of which are referred to herein as "concrete structures." Such fire stop assemblies include those described in U.S. Pat. Nos. 9,086,174 and 8,272,082 and U.S. application Ser. No. 16/584,621 titled A Sleeve Assembly for a Poured Concrete Deck and filed Sep. 25, 2019 (the contents of such references are incorporated herein by reference as if set forth in their entirety). Various penetrants, such as plumbing pipes, conduits, cables or wires pass through these passages, usually enclosed in plastic or metal pipes that extend through these passages and assemblies. These pipes are encircled by an intumescent material that expands with temperature as occurs where there is a building fire. The intumescent material expands to block the passage during a fire to retard or prevent fire and/or smoke from passing through the passage. The intumescent material is typically encircled by a metal restraint to keep the intumescent material entrained within the concrete during a fire.

In general, the intumescent material is expensive and enough material must be provided to obstruct the passage. If the penetrants are metal, then less intumescent material is needed because the metal occupies part of the passage throughout the fire and the fires are typically not hot enough to melt the metal. If the penetrants are combustible, such as plastic pipes that can melt or burn during a fire, so they no longer block the passage, then more intumescent material is needed to block the passage. To accommodate both metal and non-metal penetrants passing through the sleeve assemblies, manufacturers provide one set of sleeve assemblies with less intumescent material in a smaller diameter, metal retainer when the penetrants are metal, and provide a different set of sleeve assemblies with more intumescent material and a larger metal retainer when the penetrants are plastic. But that requires making different sleeve assemblies for metal and non-metal penetrants, where each assembly uses different intumescent rings and different retainers for use with the different penetrants. For smaller diameter passages an intumescent ring for a plastic penetrant may be used for a metal penetrant to avoid having to make two different sleeves, but that costs more because more intumescent material is used than needed. When the diameters of the passages become larger, such as 8 to 12-inch diameter (or larger) passages, the volumes (and cost) of the intumescent material to block those passages increases greatly, especially if the penetrant is plastic instead of metal. Similarly, the variation of inner and outer diameter diameters of the intumescent rings varies significantly on whether the penetrant is metal or plastic because the intumescent material for a plastic penetrant must block the entire passageway (e.g., a 10-inch passage, a 12-inch passage, 16-inch passage, etc. . . . ) instead of simply blocking the annular or cylindrical space between a 12-inch diameter passage and a 10 or 11-inch diameter metal pipe. There is thus a need for a simple method and apparatus by which a single fire stop assembly can be used for metal and plastic penetrants in order to reduce manufacturing costs for the fire stop assembly, intumescent ring and retainer, and to reduce the amount and associated cost of the intumescent material needed.

Moreover, because the intumescent material is expensive, situations may arise where there is enough intumescent material to seal the passage, but during a fire the intumescent material may be washed away sufficiently so that smoke and fire may pass through the passage. Indeed, to be certified for use in some countries these fire stop assemblies must pass several tests, one of which may include verifying that the expanding intumescent material blocks the passage through a concrete structure under conditions simulating a severe fire, and verifying that the expanded intumescent prevents passage of smoke or water through the passageway when the material sprayed with a fire hose for a predetermined amount of time. The water stream from the fire hose can degrade and wash away the expanded intumescent material, representing a potential issue on qualification testing and risk of adverse water leakage and spread of smoke and fire during use. There is thus a need for a fire stop assembly providing a strong seal when the intumescent material is expanded, such that the seal that can withstand qualification testing and improve the blockage of smoke and water through the passageway during use, even when sprayed with a fire hose. The present disclosure addresses these and other related and unrelated issues in the art.

SUMMARY

A tubular fire stop assembly defining a passage is provided that can be embedded in a poured concrete structure during use. The assembly has a base encircling and extending along the passage. The base has a tubular sleeve that also encircles and extends along the passage. A fire ring is connected to the base and has a fire ring plate with a central opening encircling the passage. An intumescent ring the is located on the fire ring plate inside the base so the intumescent ring encircles the passage. The intumescent ring has an inner and outer sidewall and opposing top and bottom walls extending between the inner and outer sidewalls. A mesh casing extends along the inner and outer sidewalls and the top wall of the intumescent ring. The mesh casing encircles the passage. The mesh casing is made of a material that does not melt or combust or decompose when held at a temperature of 1,100° F. for one hour, and that, in one embodiment, does not melt, combust or decompose when held at a temperature of 1,700° F. for at least 1.5 hours, and further does not fracture or tear when the heated mesh casing at the specified temperatures is sprayed with water that is room temperature or colder at a pressure of about 45 psi, about 45 gpm, using a one inch internal diameter hose. The tensile strength at that specified temperatures is at least 15% the room temperature tensile strength.

In further variations of the assembly, the mesh casing may extend along and enclose at least half of the surface areas of the inner and outer sidewalls and the top wall of the intumescent ring. The mesh casing may be connected to the outer periphery of the intumescent ring. The assembly may have a ledge extending inward from the base and encircling the passage with the intumescent ring located between the fire ring plate and the ledge to at least partially limit expansion of the intumescent ring that is aligned with the plate and ledge from expanding axially past the plate and ledge. The ledge may have a depending lip encircling the passage and contacting the mesh casing and may also contacting the intumescent ring.

In further variations, the assembly may have the base and intumescent ring cooperate to define a space between the outer sidewall of the intumescent ring and an outer wall of the base encircling the outer sidewall of the intumescent ring. The base has a plurality of windows located and sized so that space is in fluid communication with the windows such that concrete can enter that space through the windows or passages when the assembly is embedded in the concrete structure. The assembly is entrained in concrete which extends through the plurality of windows, and further extends into at space between the outer sidewall of the intumescent ring and an outer wall of the base encircling the outer sidewall of the intumescent ring. But the concrete need not enter that space or in some embodiment the space may be too small for concrete to enter. The assembly may include a plurality of windows in the base, extending around a majority of a periphery of the base, with the windows being large enough that concrete can enter and entrain the base in concrete during use. In such an assembly, the concrete may enter the described space, or not.

In still further variations, the assembly includes a base flange extending outward and having a plurality of fastener openings so the flange and base may be fastened to concrete forms such as a wooden deck or a corrugated metal deck. The base has two parallel sides tangent to a cylindrical base, so the bases may be placed close together. The assembly may include a smoke ring connected to the base and encircling the passage. The, the smoke ring has an inner periphery sized to engage an outer circumference of a tubular penetrant extending through the tubular fire stop assembly during use.

The mesh casing comprises a woven, galvanized steel wire mesh. Moreover, the mesh casing may have a plurality of slits in the portion of the mesh casing extending over the top wall and outer sidewall of the intumescent ring. The mesh casing may be cylindrical and is entrained in concrete around a majority of a circumference of that outer sidewall, and may be entrained around a majority of the surface area of that outer sidewall of the mesh casing. The above variations may be used with the assembly described above, or described herein, in any combination There is also a mesh enclosure for use with an intumescent ring extending through a poured concrete structure having a penetrant with a maximum outer diameter D extending through the passage. The mesh enclosure comprises a mesh casing having inner and outer mesh casing sidewalls joined by a top mesh casing wall. The outer mesh casing sidewall has a plurality of parallel slits that extend a height of the outer mesh casing sidewall and extend across at least a portion of the top mesh casing wall. The slits do not extend into or do not extend more than a very short distance into, the inner sidewall of the mesh casing. The inner mesh casing sidewall has a diameter larger than D so the penetrant does not snag on the mesh when first passed through the mesh enclosure. The mesh casing is formed of a material that does not melt or combust or decompose when held at a temperature of 1,600° F. for at least 1.5 hours.

In further variations, the mesh enclosure comprises woven, galvanized steel wire. The mesh enclosure includes the intumescent ring located between the mesh casing sidewalls. The outer mesh casing sidewall is connected to the intumescent ring. These variations may be used with the mesh enclosure describe above or described herein, in any combination.

BRIEF DESCRIPTION OF THE DRAWINGS

These and other advantages and features of the disclosure will be further appreciated in view of the following drawings and descriptions in which like numbers refer to like parts throughout, and in which:

FIGS. 4A to 4E are schematic illustrations of one manufacturing sequence for the mesh casing of FIGS. 1 and 2;

DETAILED DESCRIPTION

Figure 1:
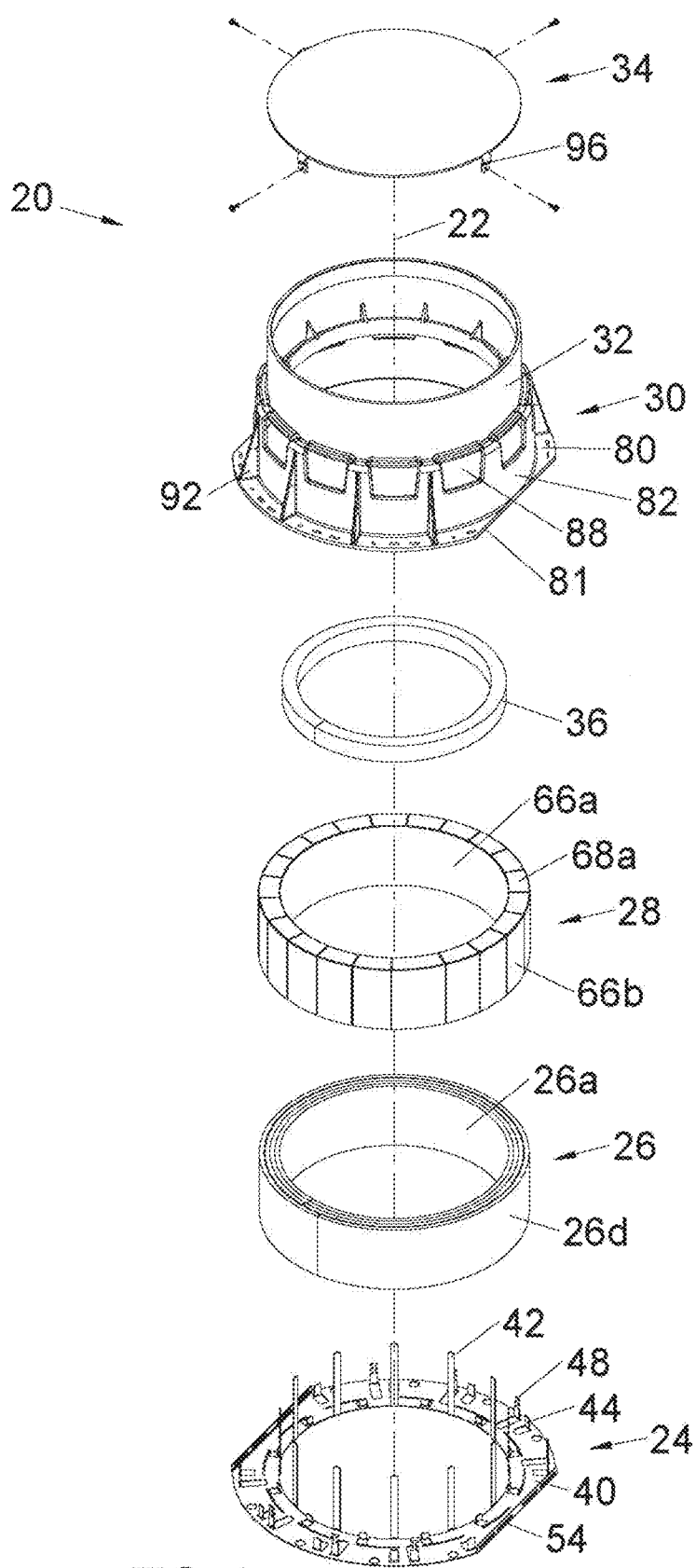
FIG. 1 is an exploded perspective view of a fire stop assembly having a fire ring, an intumescent ring, a mesh casing, a smoke ring, a base and a cap.

As used herein, the relative directions inward and outward are with respect to the longitudinal axis 22, with inward being toward the axis and outward being away from the axis. The relative directions up and down, above and below, top and bottom, are with respect to directions along the longitudinal axis when that axis is vertical, as shown in FIG. 1. As used herein, a majority or a major portion means over 50% while a substantial portion means more than 90%. As used herein, "about" encompasses a 10% variation.

As used herein, the following numbers refer to the following parts throughout.

Referring to FIGS. 1-8, and especially to FIG. 1, a fire stop assembly 20 extends along longitudinal axis 22. The fire stop assembly 20 includes a fire ring 24 which holds an intumescent ring 26 encased in a mesh casing 28 inside of a base 30 having a tubular sleeve 32 with a distal end that is removably and covered by cap 34. Tubular extensions (not shown) may be attached to the base 30 and/or sleeve 32 to extend the length of the passage through the fitting assembly and through the concrete structure. In some embodiments, a smoke ring 36 is placed inside the fire stop assembly 20, inside the base 30 so provide a temporary smoke seal between the mesh casing 28 and the pipe 38 (FIGS. 7A-7B) passing through the assembly 20. The pipe 38 may comprise a penetrant, or may carry other penetrants such as electrical wires, various cables, conduits and elongated members cables, all of which may be passed through the interior pipe 38 or may be bundled together to form the pipe 38. The pipe 38 is typically a tubular member, typically cylindrical, and usually made of metal or plastic (e.g., ABS plastic). The pipe 38 may be omitted and the various penetrants may pass through the fire stop assembly 20 individually and directly, without an enclosing structure such as a tubular pipe.

Figure 2A:
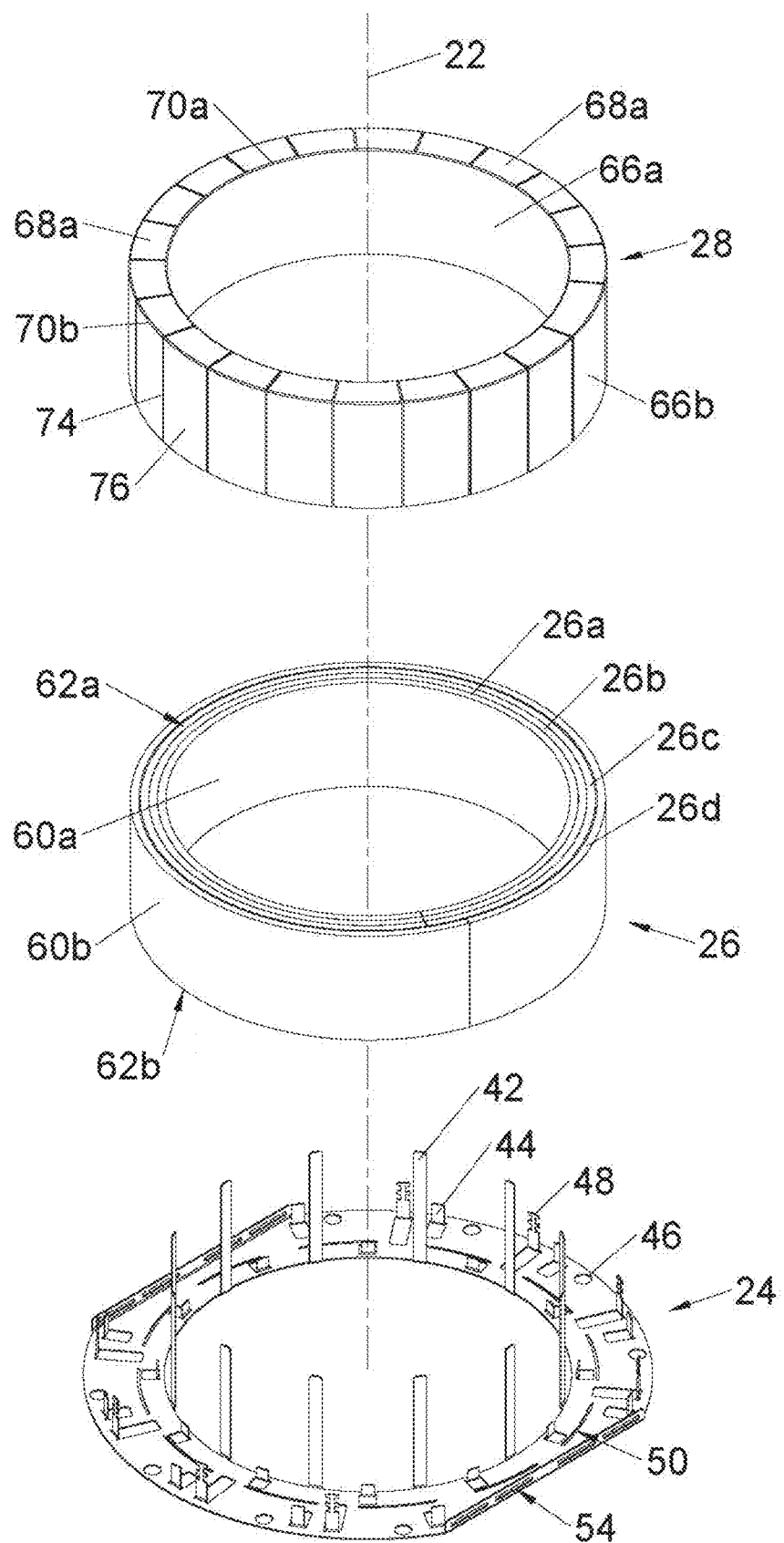
FIG. 2A is an exploded perspective view of the assembly having the fire ring, the intumescent ring and the mesh casing.

As best seen in FIGS. 1, 2A,B,C, and 3A,B, the fire ring 24 includes an annular plate 40 having an inner and outer diameter with the inner diameter slightly larger than the nominal diameter of the passage through the fire stop assembly 20 that accommodates the pipe 38. As used herein, slightly larger means 3% to 20% larger than the smaller dimension, and may be 5% to 10% larger than the smaller dimension. Thus, if the nominal diameter of the passage is 12 inches, the inner diameter of the opening in the annular metal plate 40 that is 5% larger is about 0.05×12 inches=12.6 inches. The plate 40 can be formed of metal or other materials, such as synthetic materials, composite materials, or combinations thereof. The plate 40 extends in a plane orthogonal to axis 22 and has a plurality of positioning portions, such as positioning tabs 42 extending from the inner edge of the circular opening in the plate 40 and fire ring 24. The positioning tabs 42 extend along the longitudinal axis 22 toward the cap 34. The positioning tabs 42 encircle the opening through the center of the fire ring 24 and provide a fence-like barrier to keep the penetrating pipe etc. passing through the fire ring from hitting the intumescent material 26. The positioning tabs 42 also establish the inward-most location of the intumescent ring 26 during use to keep the intumescent ring out of the path of the pipes as they are inserted through the fire ring and fire stop assembly. During fires the intumescent ring expands inward past the positioning tabs, but by then the pipe 38 has been inserted through the fire stop assembly 20. The positioning tabs 42 are usually thin, flat strips of metal having a rectangular cross-section so the positioning tabs bend easily toward the axis 22. The positioning tabs 42 may be equally spaced around the inner opening of the fire ring 24, with a spacing of an inch, two inches, etc. between adjacent positioning tabs, but other shapes and spacings may be used for the positioning tabs. The positioning tabs 42 may be long enough to extend along the axial length or height of the intumescent ring 26 so as to ensure the pipe 38 does not hit the intumescent ring on the outside of the positioning tabs 42. The intumescent ring 26 fits over and encircles the positioning tabs 42 and may contact the positioning tabs 42, and may be slightly outward of the positioning tabs 42 to further avoid potential contact with any penetrating pipe 38 passing through the fire ring 24. The positioning tabs 42 thus also can help to center the intumescent ring 26 about the circular opening in the fire ring 24.

The fire ring 24 also has a plurality of locking portions, such as locking tabs 44, that extend upward parallel to axis 22. The locking tabs 44 are periodically spaced around the axis 22. The locking tabs 44 may be-punched out of the plate 40 and may have a thin, rectangular cross-section. Each locking tab 42 fits through a mating opening in the base 30 to connect the fire ring 24 to the base 30. To one side of each locking tab 42 is a fastener hole 46 sized so a fastener can fasten the plate 40 to a concrete form, such as a sheet of plywood or a larger base for connection to a corrugated metal form.

To one side of each locking tab 42 is an entrainment portion, such as an entrainment tab 48, that may be punched out of the plate 40 to have a thin, rectangular cross-section and that extends parallel to the axis 22. The entrainment tab 48 has a distal end that is contoured for entrainment in concrete so as to resist removal from concrete when pulled along the length of the entrainment tab 48 after the concrete hardens. The contoured end is shown as having two cross-members each perpendicular to the length of the entrainment tab 48. The entrainment tab 48 fits through a mating opening in the base 30 and extends beyond that base 30 in order to further entrain the base 30 and fire ring 24 in the fluid concrete that is typically poured around the fire stop assembly 20 during installation into a poured concrete structure and that later hardens for long-term use.

Figure 3A:
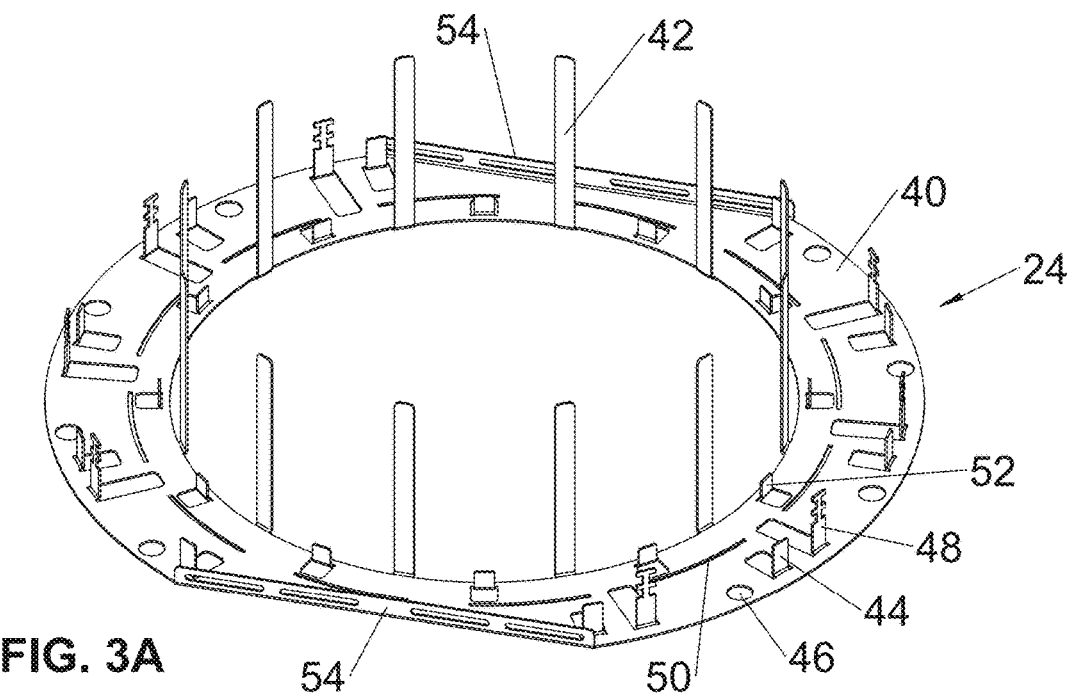
FIGS. 3A and 3B are top and bottom perspective views, respectively, of the fire ring of FIGS. 1 and 2.
Figure 3B:
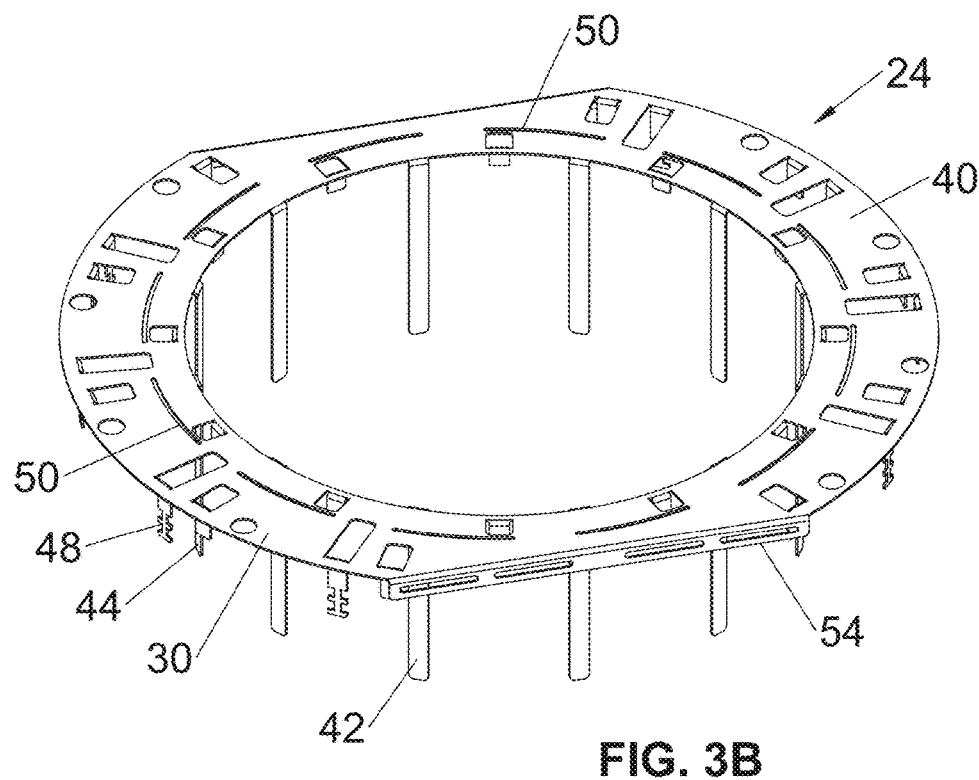

The fire ring plate 40 may have a plurality of vent openings 50 shown as curved slots, which openings 50 encircle the large, central opening in the fire ring plate 40 and which are located adjacent to that central opening and the positioning tabs 42. When the intumescent ring 26 is placed on the fire ring 24, the vent openings 50 may be on or adjacent the outer edge or outer side of the fire ring 24 as seen in FIGS. 3A-3B, so that hot gases may travel upward through the vent openings 50 to heat the intumescent ring 26 during a fire and cause it to expand.

A plurality of inner ring positioning tabs 52 may be located around the central hole through the fire ring 24. The inner ring positioning tabs 52 are punched from the fire ring plate and bent upward parallel to and slightly outward from the positioning tabs 42. The inner ring positioning tabs 52 are located to position a single layer or single ring of intumescent material, shown in FIGS. 2A-C-3A,B and 7B, as the ring or layer 26a. When the pipe 38 penetrating the fire stop assembly 20 is a metal pipe, the intumescent ring 26 need only seal inward against the pipe 38 because the pipe is not expected to melt during a fire. When a metal pipe 38 is used, a single thickness or single layer of intumescent material is usually sufficient to block the passage and the inner ring positioning tabs 52 position that single ring (26a) of intumescent material on the fire ring 24 (ring layers 26b-16e are omitted). The inner ring positioning tabs 52 may engage an outer circumference of the ring 26a of intumescent material, so the ring 26a is located between the ring of inner ring positioning tabs 52 encircling axis 22 and the positioning tabs 42, with the tabs 52 centering the single layer of intumescent material around the longitudinal axis and the central opening through the fire ring.

Referring to FIGS. 2A-C-3A,B, one or more stiffening ribs 54 may be provided on the plate 40 of the fire ring 26. The one or more stiffening ribs 54 each including an upwardly bent strait outer edge of the plate 40 along one side of the fire ring, with a second stiffening rib 54 on the opposing side of the fire ring 26. The one or more stifling ribs 54 further include first and second stiffening ribs 54 on opposing sides of the fire ring 24. The first and second stiffening ribs 54 may be parallel. In addition to stiffening the fire ring 26, the stiffening ribs 54 extend along parallel sides of an otherwise circular outer periphery. The stiffening ribs 54 allow a first fire ring 26 in a first base 30 to be placed closer to a second fire ring 26 in a second base 30. The ribs 54 may extend along the outside of a straight side 81 of an otherwise annular and circular base flange 80. The ribs 54 are located very close to the outer periphery of the intumescent ring 26 and the mesh casing 28. The straight sides 81 of the flange 80 may be tangent to the circular base sidewall 82.

Figure 2B:
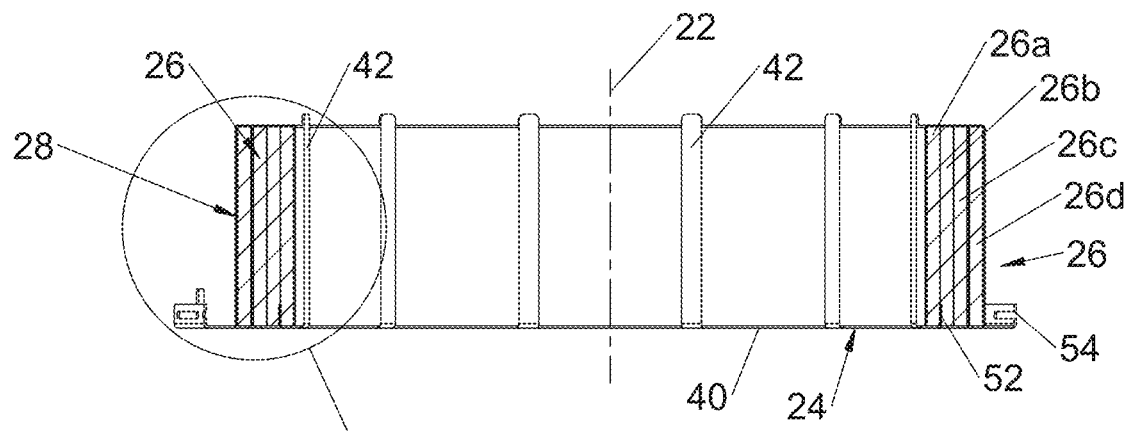
FIG. 2B is a sectional view of the assembled fire ring, the intumescent ring and the mesh casing of FIG. 2A.
Figure 2C:
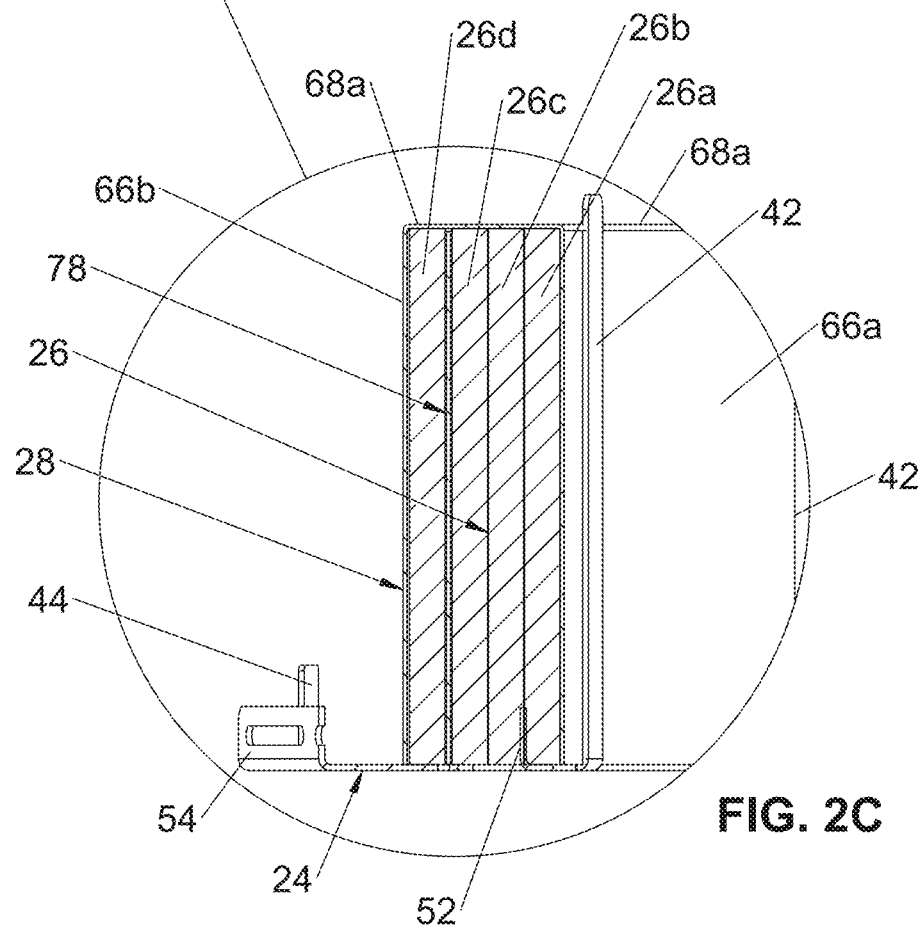
FIG. 2C is an enlarged portion of the section of FIG. 2B.
Figure 7A:
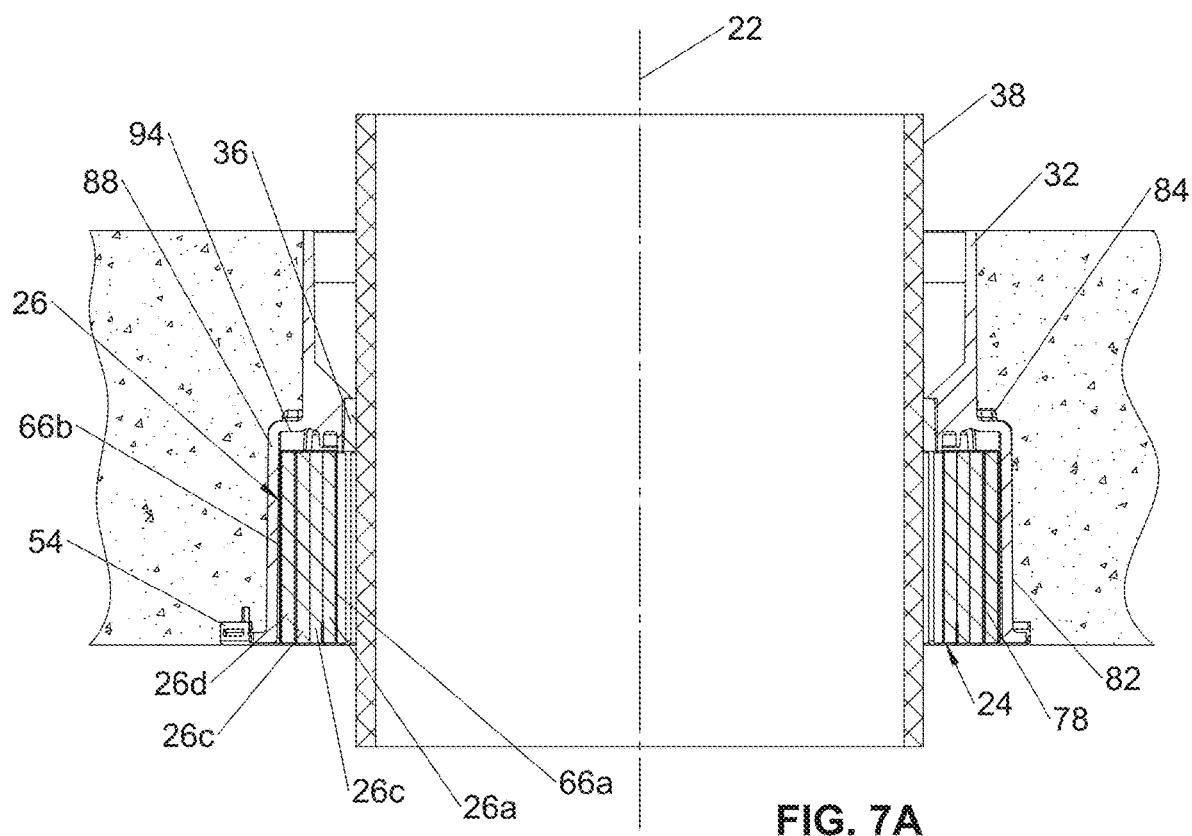
FIGS. 7A and 7b are sectional views of the fire stop assembly of FIGS. 1 and 6A,B embedded in a concrete structure, with FIG. 7A showing an intumescent ring having multiple layers and FIG. 7B showing the intumescent ring having one ring surrounded by a larger void space.

The intumescent ring 26 may be formed of any suitable intumescent material, including annular rings of predetermined inner and outer diameter, or other configurations. The intumescent material is typically sold in long strips of fixed width and thickness and is cut to length as needed and then formed into a ring to encircle the pipe 38 and axis 22. A single intumescent ring 26 formed of a single strip of intumescent material is typically sufficient for a metal pipe 38 where the intumescent material must expand to fill only the annular or cylindrical space between the intumescent ring and the pipe encircled by the intumescent ring 26. But a plastic pipe 38 can melt during a fire, so an intumescent ring 26 formed of multiple concentric strips of intumescent material is usually required for a plastic pipe where the intumescent material must expand to fill the entire passage encircled by the intumescent ring 26. The number of layers of intumescent material 26 required will depend on the material used, the diameter of the passage to be blocked and the type of penetrant (e.g., metal, plastic or both). Four concentric rings 26a, 26b, 26c and 26d are shown in FIGS. 2B-2C and 7A, with the inner most layer or ring 26a located inward of the inner ring positioning tabs 52, and the three outer layers or rings 26b-26d encircling and wound around or close to the positioning tabs 42. The number of individual layers or rings 26 is limited by the radial width of the fire ring 24. Vent openings 50 extending through the plate of the fire ring 24 are periodically spaced around the periphery of the fire ring. The locking tab 44 and entrainment tab 48 are punched out of the fire ring plate 40 and the openings formed by each locking tab 44 extends extend below a portion of one or more of the layers forming the intumescent ring 26 to serve the same function as the vent openings 50. From one to five or more concentric rings of intumescent material are believed suitable for pipe diameters up to 15 inches or larger, with larger numbers of layers required for plastic pipes that may melt during a fire.

The concentric rings may be stacked vertically. Two stacked rings of two to five rings of intumescent material are believed suitable for most applications involving passages about 10 to 12 inches in diameter. The axial length or height of the intumescent ring 26 and its concentric layers is about the same as the axial length of the positioning tabs 42 to hold the intumescent material out of contact with the penetrating objects such as pipes 38, etc. that pass through the fire stop assembly 20 when it is entrained in fluid concrete to form a poured and hardened concrete structure. If concentric rings of intumescent material are stacked vertically, the axial length of the positioning tabs 42 may not extend beyond the axial length of one layer of concentric rings, but all of the positioning tabs 42 may extend to the full axial length of the stacked concentric rings and slightly beyond.

Referring to FIGS. 2A-2C, a majority of the outer surface of the intumescent ring 26 is enclosed in a mesh casing 28, which may be a mesh made of a metal or carbon or other material that does not melt under the anticipated fire temperatures or under the qualification test temperatures. Generally, no more than three of four sides of the intumescent ring 26 are covered. The intumescent ring typically has a rectangular cross section (which includes a square cross-section). A mesh that does not melt or burn or decompose when held at a temperature of at least 1,600° F., such as up to 1,700° F., for at least a time period of 1.5 hours, such as 3 hours, is believed suitable for the mesh casing 28. A mesh having a gridwork with openings of 0.02 to 0.1 inches is believed suitable, such as openings of 0.02 to 0.09 inches, 0.02 to 0.08 inches, 0.02 to 0.07 inches, 0.02 to 0.06 inches, 0.02 to 0.05 inches, 0.02 to 0.04 inches, 0.02 to 0.03 inches, etc., with larger mesh openings, such as 0.2 inches, 0.3 inches, etc. or more, believed usable. If the mesh used in the mesh casing 28 is too fine it is less deformable and unduly restrains expansion of the intumescent material covered by the mesh. If the mesh 28 is too coarse then it offers little retention or expanded intumescent material broken up by spray from a fire hose, and/or offers little protection of the expanded intumescent material when sprayed with a fire hose. Woven galvanized steel wire having 0.014 inch diameter, with a 24×24 mesh with a 0.028 inch opening size and 44% open area is believed suitable. An open area varying between 35% and 60% may be used, such as with an open area of 40-50%. The woven mesh is believed to provide more flexibility in conforming to the shape of the intumescent material as it expands.

Referring to FIGS. 1-2A-C and 7, the intumescent ring 26 has an annular shape with inner and outer concentric and usually cylindrical sidewalls 60a, 60b, and top and bottom annular end walls 62a, 62b. The cross-section of the intumescent ring is typically a rectangular shape. The mesh casing 28 is placed around at least both of those sidewalls 60a, 60b and the top wall 62a to form a mesh casing 28 around those portions of the intumescent ring which casing has a cross-sectional shape that is U-shaped or hat shaped. The mesh casing 28 may be wrapped around some or all sides and top and bottom walls of the intumescent ring 26, and the mesh casing 28 may be pre-formed into the mesh casing 28 and having a shape similar to that of the those sidewalls and end walls of the intumescent ring 26, but slightly larger than the intumescent ring and with one open end wall so as to allow the intumescent ring to be inserted into the casing or the casing to fit over the intumescent ring 26.

A mesh casing 28 having concentric, inner and outer cylindrical sidewalls 66a, 66b joined by an annular top wall 68a may thus be provided, with the casing having an inverted U-shaped or hat shaped cross-sectional shape. When the casing 28 and intumescent ring 26 are fit together, the inner sidewalls 60a, 66a are adjacent each other, the outer sidewalls 60b, 66b are adjacent each other, and the top walls 62a, 68a are adjacent each other and may be contacting one another. The top wall 68a extends between inner and outer corners 70a, 70b which are at the top of the inner and outer side walls 66a, 66b, respectively. For a cylindrical passage through the fire stop 10, the inner and outer sidewalls 60a, 60b may be cylindrical and the top wall 68a has an annular shape.

The mesh casing 28 may be formed by interwoven wires or fibers, or sheets punched with a plurality of holes in a predetermined pattern such that the holes occupy more than half the surface area of the mesh casing 28 and may be more than 80% of the surface area. The mesh casing 28 is believed to serve several functions. For example, metal and carbon mesh casing conduct heat well, and by conducting heat to the intumescent material 26 enclosed within the mesh casing it is believed that the material expands rapidly in a fire.

The openings in the mesh casing 28 further are believed to allow hot gases and smoke from a fire to heat the intumescent material 26 so again the material expands rapidly in a fire. The mesh casing 28 is believed to allow flexibility so the mesh can move with the expanding intumescent material and still cover a portion of the surface of the expanding and expanded surface of the intumescent material sufficiently. The mesh casing 28 is believed to provide protection to the expanding and expanded intumescent material by shielding and deflecting water streams and by helping to hold the expanding and expanded intumescent material together under the impact of firefighting streams of water. The mesh casing 28 is believed to reduce the amount of expanded intumescent material that is washed away by fire hoses and assist the plug formed by the expanded material to block the passage through the fire stop that is sealed by the intumescent material for a longer period of time than if the mesh casing were not used. It is believed the mesh casing 28 enclosing the inner and outer sidewalls of the intumescent ring 26 and the top of that intumescent ring, can extend the duration of a blocked, ten inch diameter passage an additional five minutes than if the mesh casing were not used.

The mesh casing 28 may be formed of metal sheet punched to form the described mesh, or it may be formed from a sheet of mesh wire or carbon or perforated sheet, or other high temperature material that has a thermal conductivity the same as or greater than that of the lowest thermally conductive stainless steel. Referring to FIGS. 4A-4E, a strip 72 of mesh has a width W that is the same or slightly greater than the outer circumference of the intumescent ring 26. The strip 60 has a height selected to extend along the inner sidewall 82a, top wall 62a and outer sidewall 82b of the intumescent ring 26, with a little extra height to allow for easy fitting of the parts together. A series of vertical slits 74 extend to what will be the top corner 70a of the inner casing sidewall 66a to form a plurality of segments 76 between each pair of adjacent slits 74 as shown in FIG. 4B. Each of the segments 76 are bent at the top inner corner 70a right angles to the strip of mesh as in FIG. 4C. Each of the segments 76 are bent a second time at the top outer corner 70b and bent at right angles so the longer leg of the segments can form outer sidewall 66b that is parallel to strip inner wall 66a. The strip 72 then has a U-shaped or hat shaped cross section and rolled into a cylinder with the segments to form the mesh casing 28 with opposing sides of the strip 72 fastened together by crimping, spot welding, wire, clips, various fasteners or other connection devices to maintain the cylindrical shape. The edges of the segments 76 on opposing sides of the slits 74 may be spaced or splayed slightly apart as they are bent and/or rolled into the cylinder. The resulting mesh casing 28 thus may have vertical slits 74 separating segments 76 that form the top wall 68a and outer sidewall 66b.

The intumescent ring 26 fits or is otherwise received inside the mesh casing 28 with the annular end wall 68a resting on top of the annular top end 62a of the intumescent ring. The casing outer sidewall 66b surrounds the outer periphery and outer sidewall 82b of the intumescent ring 26 and is shown as a cylindrical wall with multiple flat segments 76 separated by slits 74 that allow the encasing wall to be bent into the cylindrical shape. The annular bottom wall 62b of the intumescent ring 26 is not typically covered by the mesh casing 28, but could be if desired.

Figure 8A:
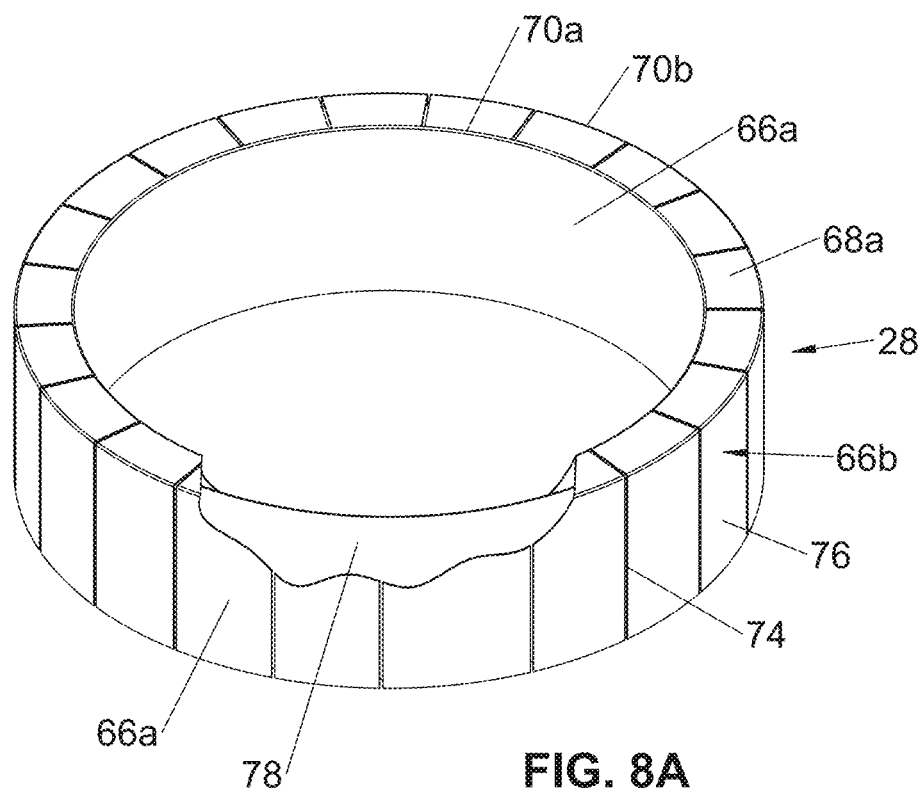
FIGS. 8A and 8B are top and bottom perspective views, respectively, of the mesh casing of FIGS. 1 and 2A,B with an intermediate mesh ring located therein.
Figure 8B:
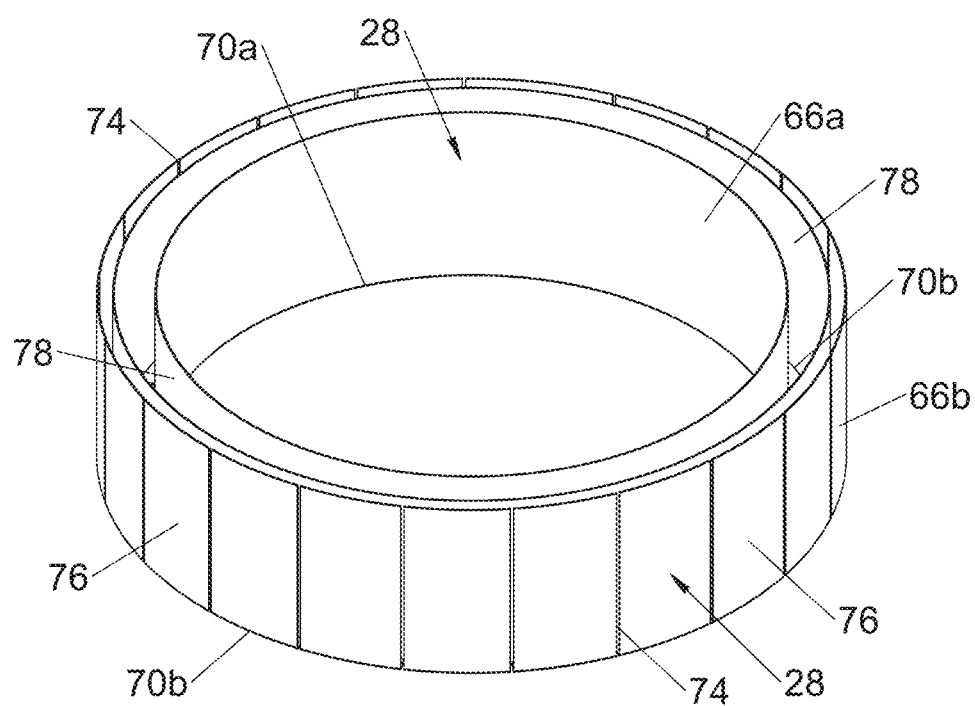

Referring to FIGS. 7A and 8A—8B, an intermediate mesh ring 78 may be provided between one or more layers of a multilayer intumescent ring 26. The intermediate mesh ring 78 is shown as a cylindrical ring placed between intumescent layers 26c and 26d and not fastened to the mesh casing 28. While FIGS. 8A-8B show the intermediate mesh ring 78 positioned within the mesh casing 28, that is primarily to show its relative position with respect to the inner and outer surfaces 66a, 66b of the mesh casing. The intermediate mesh ring 78 is placed between the selected two layers of a multi-layer intumescent ring when the layers are being assembled in a concentric ring layup to form the multi-layer intumescent ring 26. The intermediate mesh ring 78 is pressed or otherwise received into one or both adjoining layers of intumescent material, or the material is pressed or is otherwise received into the mesh ring 78. The intermediate mesh ring 78 may to provide additional interconnection of the adjoining layers of intumescent material and increased integrity to the plug formed by the expanded intumescent ring 26 during use and during qualification testing or rating testing. The intermediate mesh ring 78 is also believed to improve the resistance of the two adjoining layers of intumescent material on opposing sides of the intermediate mesh ring 78 when the material is expanded and sprayed with a stream of water from a fire hose during use and during testing.

Referring to FIGS. 1, 2A-C, 3A,B and 5A,B-6A,B, the assembly of the fire ring 24, mesh casing 28 and intumescent ring 26 is achieved by fastening the intumescent ring between the fire ring and the base 30 with the fire ring and intumescent ring both located inside the base 30. The distal end of the locking tabs 44 and entrainment tabs 48 extend through corresponding lock tab openings and entrainment tab openings formed in the base 30, which may be formed in an outward extending base flange 80 on the base 30. The base flange 80 may be orthogonal to longitudinal axis 22. The locking tabs 44 are bent over an exterior surface of the base flange 80 to connect the fire ring 24 to the base 30. The locking tabs 44 extend around the circumference of the fire ring 24 and thus connect to the base 30 around the entire circumference of the base 30. The entrainment tabs 48 extend above the base flange 80 to engage the concrete and interlock the fire ring 24 and base 30 to the fluid concrete poured around the fire stop assembly 20. A plurality of fastener openings are located and aligned to coincide with fastener holes 46 so fasteners (e.g., nails, threaded fasteners) can pass through the aligned fastener holes to connect the base 30 and fire ring 24 to the concrete support surface such as a plywood deck or a baseplate for the assembly 20, or to a corrugated support. As indicated, the various openings in base flange 80 are axially aligned with the entrainment tabs 48, locking tabs 44 and fastener holes 46 around a circumference of the fire ring 24 and base 30.

Figure 5A:
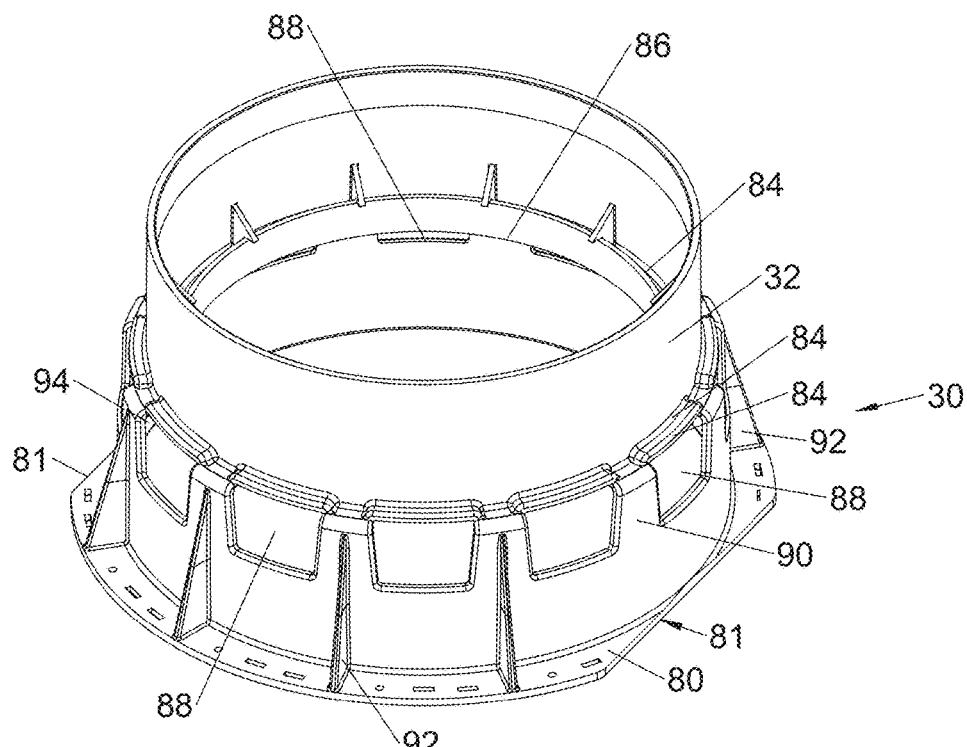
FIGS. 5A and 5B are top and bottom perspective views, respectively, of the base of FIGS. 1 and 2A,B.
Figure 5B:
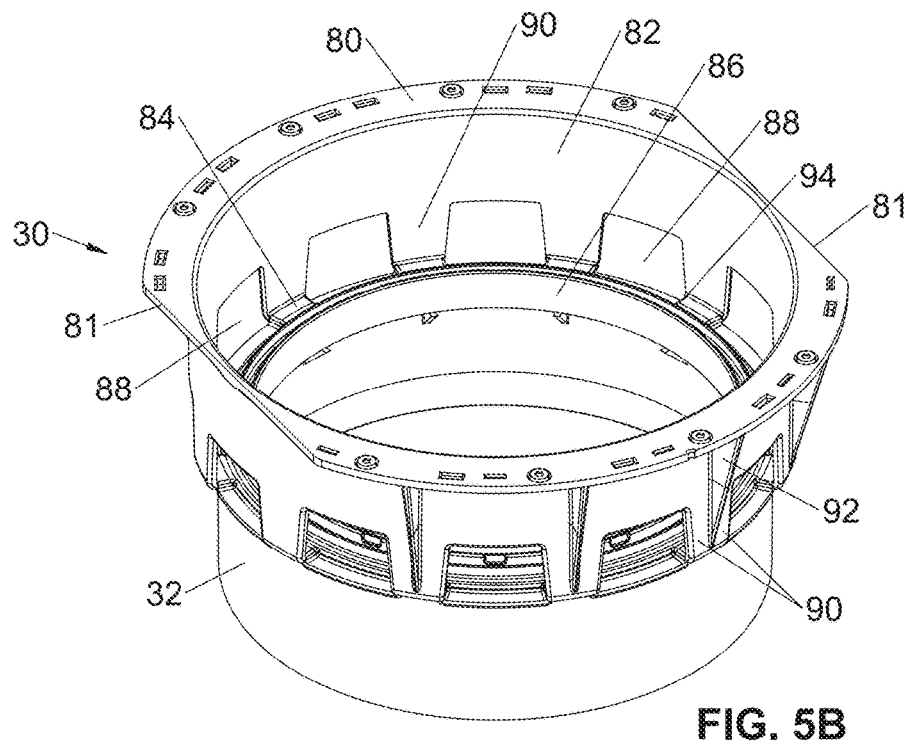

Referring to FIGS. 5A,B-6A,B, the base 30 may have a tubular base wall 82 extending from the base flange 80 along the longitudinal axis 22. The base wall 82 encircles and is centered on longitudinal axis 22. The base wall 82 may be slightly larger in diameter than the tubular sleeve 32 to form a laterally extending base ledge 84 located at the top of the base wall and extending inward toward axis 22. The tubular sleeve 32 is slightly smaller in cross-sectional size than the base wall 34 and extends from the top of the base ledge 84.

An inner periphery of the base ledge 84 has a short, cylindrical flange 85 (FIG. 5B) encircling the passage and parallel to axis 22, with a depending lip 86 on the flange 85 extending downward toward the plane of the base flange 80. The depending lip 86 is spaced from the base wall 82 a distance sufficient to accommodate the radial thickness of the intumescent ring 26, and in some cases greater than that, when the fire ring 24 is connected to the base 30. With reference to FIGS. 1, 2A, and 5A,B, the depending lip 86 contacts the mesh casing 28 and may press an upper portion of the casing 28 against the intumescent ring 26, at the top casing wall 68a. The base ledge 84 is located high enough along axis 22 to accommodate the axial length or height of the intumescent ring 26 when the fire ring 24 is connected to the base 30, but is close to the top wall 62a of the intumescent ring to limit immediate expansion of the intumescent ring 26 upward along the axis 22 and to force the expansion inward and upward between the annular gap between the base ledge and the pipe 38. The depending lip 86 contacting the top wall 68a of the mesh casing 28 and the top wall 62a of the intumescent ring 26 also limits immediate expansion of the intumescent ring 26 upward along the axis 26 and forces the expansion inward and upward between the annular gap between the depending lip and cylindrical flange 85 and the pipe 38.

The positioning tabs 42 end at the base ledge 84 and openings may be formed in the base ledge 84 to receive the top of the positioning tabs 42 or the top ends of positioning tabs 42 may overlap the inside of a portion of the base ledge 84 (FIGS. 5A-5B) with the base ledge 84 containing a depending lip 86 to engage the positioning tabs 42 as needed. The top end of the positioning tabs 42 may be restrained to avoid extending inward and engaging the pipe 38 as the pipe 38 is placed through the base 30. The intumescent ring 26 nests or is otherwise received into that partial annular recess (formed by the base wall 82, the base ledge 84 and the depending lip 86) so the top of the intumescent ring 26 is immediately adjacent the laterally extending base ledge 84 and restrained from movement in the radial direction by the depending lip 86 and the base wall 82 when the fire ring 24 is connected to the base 30.

Referring to FIGS. 5A.B, 6A,B and 7A,B, the tubular sleeve 32 may join the base ledge 84 inward of the base wall 82, close to the base wall 82. A plurality of openings or passages, such as open windows 88 extend through the base wall 82 and provide access to the space below the ledge 84 and the intumescent ring 26. The open windows 88 are spaced periodically around the outer periphery of the base wall 82 and may be located at the top of the base wall and extend into an outer portion of the ledge 84 but do not extend into or thorough tubular sleeve 32. Thus, the open windows 88 provide access to the space below the lateral ledge 84 on the inside of the base wall 82.

The windows 88 may have various shapes but are rectangular in shape, recognizing that the windows are formed in a curved base wall 82 and are thus curved, with an open top extending through that portion of the ledge 84 located radially outward of the tubular sleeve 32—so that the reference to rectangular windows herein includes that curved shape. In the depicted embodiment of FIGS. 1, 5A,B, 6A,B and 7A,B, the open windows 88 are formed in the base wall 82 that extends continuously around the longitudinal axis 22 below the windows, with the base wall 82 extending intermittently around that axis where the windows 88 are located. The open windows 88 may extend less than half the axial length or axial height of the intumescent ring 26, or may extend more than half the axial length of the intumescent ring and in either case the intumescent ring is visible to the eye through the windows. The open windows 88 may extend along a substantial portion of the axial length or height of the intumescent ring 26, and may further extend from (and through) the base ledge 84 to the base flange 80 (but not through the base flange. Longitudinal legs 90 defined by the base and base ledge 84 extend between adjacent windows 88.

The windows 88 allow concrete flow into or otherwise to enter the base 30 and enclose the outer sidewall of the intumescent ring 26 in concrete, which provides a way to direct the expansion of the intumescent ring 26 inward, without outward expansion reducing the effectiveness of the expansion of the intumescent ring 26 and without the cost and configuration issues of locating a wall immediately adjacent that outer sidewall when the location of that sidewall is uncertain with varying numbers of intumescent layers.

A stiffener 92 extends between the base wall 82 and the base flange 80 at periodic locations around the base 30 to strengthen the tubular sleeve 32 and base 30 in axial compression and bending. Where the base wall 82 is intermittent so the open windows 88 extend through the base flange 80 and the windows are separated by longitudinally extending legs 90, the stiffeners 92 support and stabilize the segment of the base flange 80 to which each stiffener is connected.

Each stiffener 92 forms a triangular-shaped plate extending outward from the bottom end of the base, extending between the base wall 82 and base flange 80, or the legs 90 forming the intermittent outer wall and the intermittent base flange. The stiffeners may be aligned in radial planes through longitudinal axis 22. The stiffener 92 may be located between each adjacent open window 88. Thus, the windows and stiffeners alternate around the circumference of the base 30. The stiffeners 92 may be single plates as shown, or a plurality, e.g., pairs of spaced-apart plates at each stiffener location, or stiffeners with open cross-sections that open upward to better avoid concrete voids such as an open U-shaped cross-section opening upwards, or other stiffening configurations. Where the windows 88 extend through the bottom end of the base wall 82 to form legs 90, a stiffener 92 extends between the intermittent base wall 82 and the intermittent base flange 80 at each circumferential side of a leg 90 to form an enlarged foot on the bottom end of the leg, to provide a more stable support for the base 30 and tubular sleeve 32. The base flange 80 extends circumferentially across the bottom end of each leg 90 to connect to the fire ring 24, as by threaded fasteners. Other configurations of the legs 90 and stiffeners 92 may be used, with the legs extending outward at the bottom end of the base 30.

The stiffeners 92 may help to offset the strength lost by removing material to form the open windows 88, especially when the axial length of the windows exceeds half the axial height of the base wall 82. The stiffeners 70 and feet not only increase the axial and bending strength of the fire stop assembly 20, but when entrained in concrete they also resist rotation of the base 30 and tubular sleeve 32 about the axis 22. The use of open windows 88 extending axially to or through the base flange 80 and the use of legs 90 and stiffeners 92 to define those windows 88, provide a larger area for wet concrete to enter the area outside of the intumescent ring 26 and for air to escape the area below the lateral ledge 84 than does the configuration which has a shorter axial length of the open windows 88. A vertical opening in part of base ledge 82 above the window 88 forms a vent recess 94 (FIGS. 7A-7B) to further avoid trapping air under the base ledge by allowing it to vent vertically through the vent recess at the top of one or more windows 88.

While wet concrete enters the open windows 88 when the concrete structure is poured, it is not desirable to have the wet concrete enter the inside of the fire stop assembly 20 where it could block or obstruct the passage of a penetrant such as pipe 38 through the fire stop assembly 20 or break part of the fire stop assembly 20, such as when any hardened concrete extending into the fire stop assembly 20 is removed.

Referring to FIGS. 1, 5B, 6B and 7A-7B, a smoke ring 36 is connected to the inside of the base 30, the sleeve 32 or the depending lip 86 to provide a smoke seal between the fire stop assembly 20 and a pipe 38 passing through the fire stop assembly 20. The smoke ring 36 is a compressible ring that seals the space between the inside of the fire stop assembly 20 and the penetrating tube. The smoke ring 36 helps block the passage of smoke between the smoke ring 36 and the pipe or conduit passing through the fire stop assembly 20—until the intumescent ring 26 can expand. The smoke ring 36 can be made of a polymer or elastomeric material, such as polystyrene, polypropylene, polyurethane, or other suitable polymeric materials, or combinations thereof. In addition, or in the alternative, the smoke ring 36 could be made of an intumescent material.

The smoke ring 36 may be positioned at various locations inside the sleeve 32 and base 30, such as located at or adjacent the depending lip 86, in part because that is the closest part of the fire stop assembly 20 to the longitudinal axis 22 and thus the radial length of the smoke ring 36 is smaller than if the smoke ring 36 were located elsewhere. The smoke ring 36 is shown as comprising an annular ring centered about axis 22 during use, and having a square cross-section. The cross-sectional shape will usually become more rectangular as the outer diameter of the penetrating tube becomes smaller than the diameter of the depending lip 86. The smoke ring 36 has an adhesive on its outer surface so it adheres to the inward facing side of depending lip 86 or sleeve 32. The adhesive could be on the depending lip 86 or sleeve.

Figure 6A:
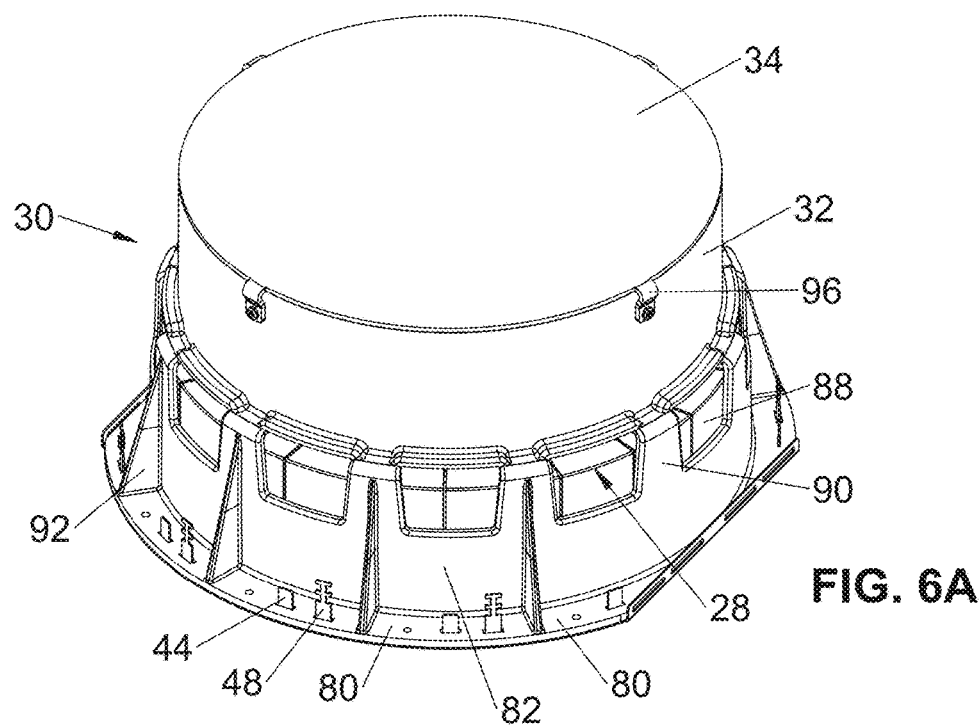
FIGS. 6A and 6B are top and bottom perspective views of the fire stop assembly of FIG. 1.
Figure 6B:
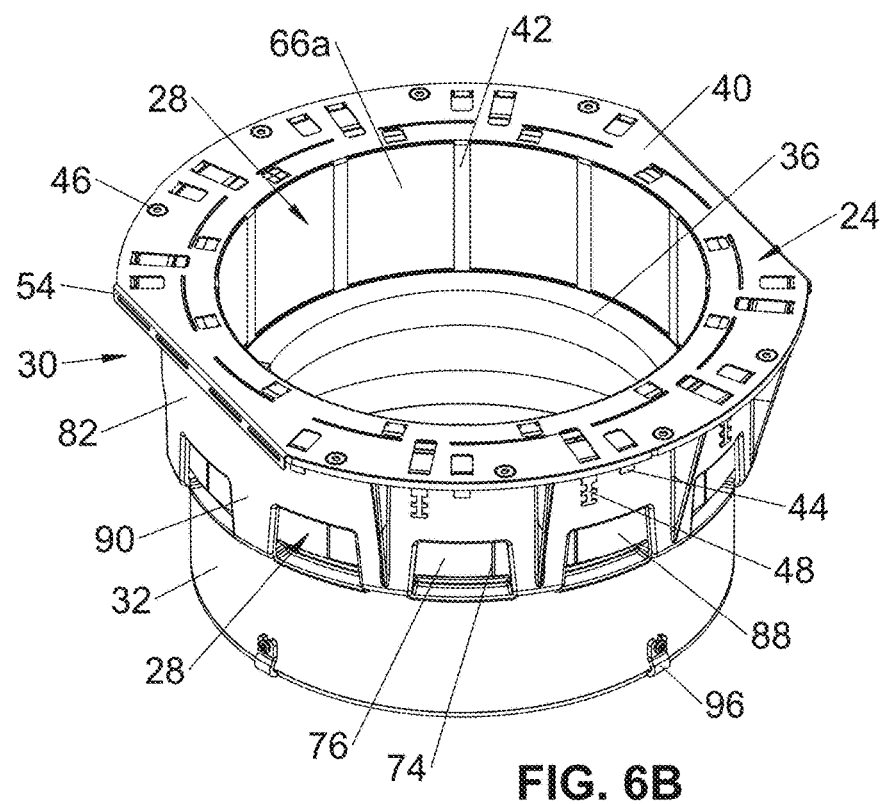

Referring to FIGS. 1 and 6A, a cap 34 may be releasably connected to the top end of the tubular sleeve 32. The cap 34 and its removable connection mechanism such as latches 96 may be of any material, including metal. The cap 34 may be made of plastic, including PVC, as well as a metal, such as steel. The cap 34 is shown as a flat disk with depending latches 96 that form curved leaf springs that are resiliently urged toward the axis 22 and sleeve 32 to frictionally engage the outer surface of the tubular sleeve 32, although the latches 96 could engage the inner surface of the tubular sleeve 32. Threaded fasteners (FIG. 1) may pass through notches in the distal end of the latches 96 or through holes in the latches, to secure the latches 96 and cap to the sleeve 32 of the base 30. But other configurations of the cap 34 could be used and other releasable connecting mechanisms also could be used, including mating threads on the cap and tubular sleeve 32, or overlapping flanges on the mating parts, or latches on one part and catches on the other mating part to form snap lock fittings. The cap 34 covers the open top of the tubular sleeve 32 when wet concrete is poured over and around the fire stop assembly 20 to embed it in concrete, with the cap 34 removed after the concrete hardens so that penetrants can pass through the passageway in the concrete structure formed by the tubular sleeve 32 and base 30. The cap 34 keeps the concrete from entering the inside of the fire stop assembly 20 from the top of the tubular sleeve.

Figure 7B:
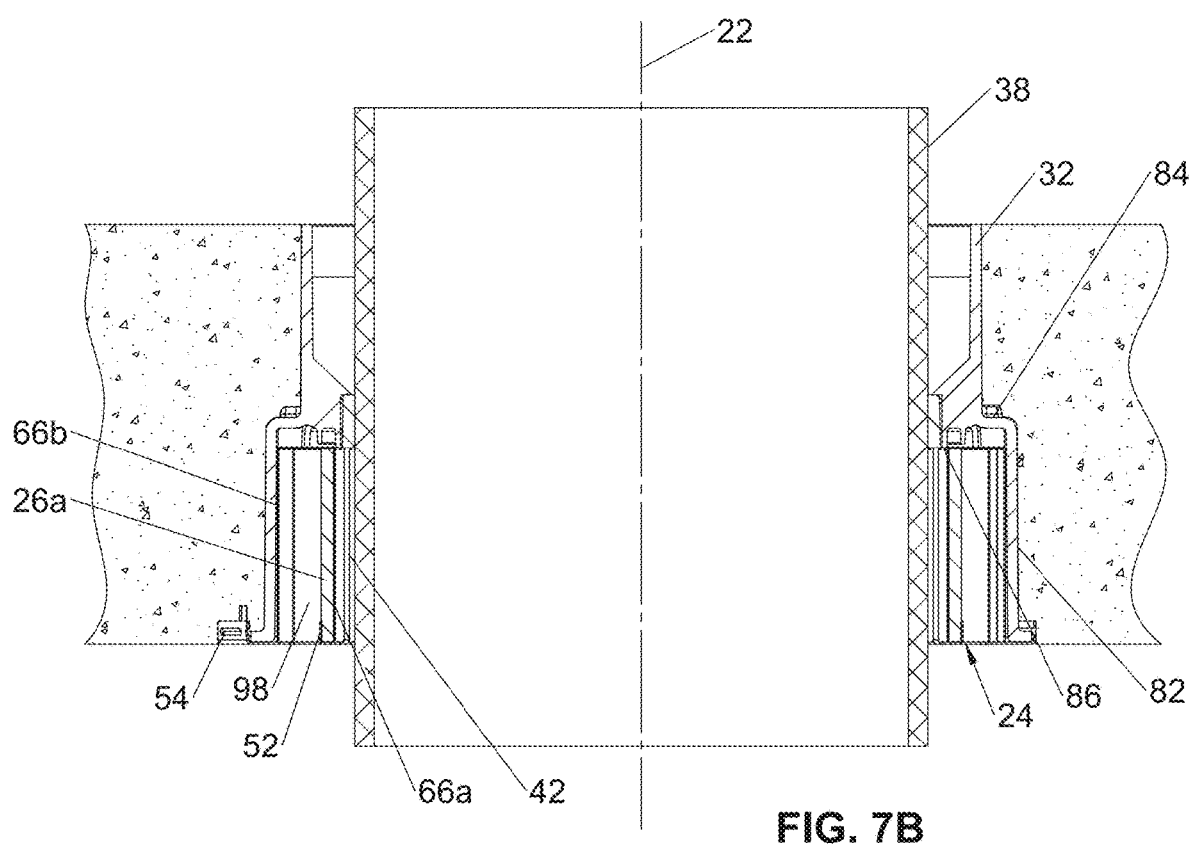

Referring to FIGS. 7A-7B, the space below the lateral ledge 84 and partially bounded by the depending lip 86, positioning tabs 42, base wall 82 and fire ring plate 40 contains the intumescent ring 26. From one to several intumescent layers may be used to form the ring 26 so the radial thickness of the intumescent ring may vary greatly, leaving a small or large annular void space 98 (FIG. 7B) between the outer facing side of the intumescent ring 26 and the adjacent and facing base wall 82 (and the ledge 84 and fire ring plate 40).

The open windows 88 open onto this void space 98 and are large enough to allow wet concrete to enter the void space through the open windows. The windows 88 extend into the outer portion of the lateral ledge 84 to form a top air vent so that air can flow freely upward during concrete pouring and thus reduce air bubbles forming and being trapped in the wet concrete in the void space 98. The depicted and described windows 88 are believed to reduce or entirely eliminate the formation of bubbles in the void space 98 when used with the described concrete. The windows 88 may be 1-2 inches in circumferential length and 0.5 to 1 inch high so they are at least 2 times larger than the aggregate used in the poured fluid concrete, such as 5 times larger or greater than 5 times larger than the aggregate used in the poured fluid concrete.

The vent openings 50 open just radially inside the base wall 82 so that if the void space 98 is filled with intumescent material from intumescent ring 26, then smoke from a fire can pass through the vent openings 50 to heat the intumescent material. If the void space 98 is filled with or otherwise receives concrete, then the concrete could block or obstruct the smoke passage through the vent openings 50.

If the void space 98 is not filled, the intumescent ring 26 must expand outward during a fire to fill this void space and that reduces the inward expansion of the intumescent material. By filling the void space 98 with concrete, the intumescent material expands inward more efficiently. By allowing one configuration of the base 30 to accommodate intumescent rings 26 that are both radially thick and radially thin, the number of parts that need to be made and stocked for different sizes of intumescent rings is greatly reduced. One fire stop assembly 20 may be used for intumescent rings 26 of varying radial dimensions. Further, the concrete passing through the windows 88 and into the annular void space 98 entrains the base 30 in the concrete and provides a stable and strong ring of concrete surrounding the outer periphery of the intumescent ring 26 against which the intumescent material may push as it expands inward toward axis 22 under the high temperatures that can arise during a fire.

Referring to FIGS. 1-2A,B and 7A,B, in use, one or more strips of intumescent material are wrapped into a ring shape and placed around the positioning tabs 42 to form a ring of intumescent material 26 of desired radial thickness and axial height. The intumescent material is provided in strips having thicknesses that include ⅟₃₂, ⅛, ¼ and thicker strips (2 mm, 3.2 mm and 6.4 mm). The strips may be cut to length and formed into a ring placed around the outside of positioning tabs 42. If the intumescent ring 26 forms a single layer, it may be placed so its outer periphery contacts the inner ring positioning tab 52. If the intumescent ring 26 includes more than one layer or ring 26a, 26b, etc, the inner ring 26a is may be placed to contact the inner ring positioning tab 52 with the next outer layer or ring 26b on the opposing side of the tab 52. The inner ring positioning tab 52 has a rounded or pointed top end so it can fit between adjacent layers of intumescent material, or even embed itself in one of the layers or rings of intumescent material. The tab 52 helps restrains lateral movement of the intumescent ring 26 before and during installation in a concrete structure. If the of intumescent ring 26 is not of sufficient height, more than one ring or set of concentric rings can be stacked on top of each other.

The intumescent ring 26 may be placed inside the mesh casing 28 and then placed onto the fire ring 24, or the intumescent ring 26 may be placed onto the fire ring 24 and then the mesh casing placed over the intumescent ring 26. Other assembly sequences may be used, however, without departing from the scope of the present disclosure. The more intumescent layers that are added, the larger the radial thickness of the intumescent ring 26 and the smaller the void space 98. The sub-assembly of the intumescent ring 26, fire ring 24 and mesh casing 28 is then connected to the base 30 and tubular sleeve 32 by passing the plurality of entrainment tabs 48 and locking tabs 44 through the respective holes in the base 30, such as in the base flange 80, and then fastening them together by bending the locking tabs 44. Usually, the base 30 is aligned along axis 22, rotated to align the openings in the base 30 with the tabs 44, 48, and then the base 30 is moved toward the fire ring 24 until base flange 80 contacts the fire ring plate 40. This alignment and axial movement also nests or retains the positioning tabs 42, intumescent ring 26 and mesh casing 28 inside the space bounded by the base ledge 84, depending lip 86 and base wall 82. The locking tabs 44 then are bent over to secure the fire ring base plate 40 and fire ring 24 to the base 30 and tubular sleeve 32. The entrainment tabs 48 extending through the holes 56 in the base 30 may be left undeformed or bent slightly as those tabs 48 are entrained by the poured fluid concrete to interlock the concrete with the tabs 48 and associated base 30 and fire ring 24. In this assembly, the top end 62a of the intumescent ring 26 and the top wall 66a of the mesh casing 28 are-contacting the bottom of the base ledge 84 so little and no concrete entrains some or all of the top wall 66a of the mesh casing 28. The depending lip 86 extends down past the inner periphery of the intumescent ring 26 and contacts the intumescent ring 26 to prevent any cement or wet concrete from going inward of the depending lip and into the passage through the fire stop assembly. Concrete is made from a mixture of cement and aggregate, with the cement having particles that are many times smaller than the aggregate which can vary from the size of sand to gravel to rocks. Sometimes a little cement leakage into the space between the inward extending base ledge 84 and the top mesh casing wall 66a and top wall 62a of the intumescent ring may occur, but the spacing is small enough that the aggregate (e.g., sand and gravel) in the concrete cannot pass and the space is small enough that little or no cement enters that space.

To allow the intumescent ring 26 and mesh casing 28 to be easily inserted into the outer diameter of the base 30, the intumescent ring 26 and casing 28 are smaller than the inner diameter of the base wall 82. A difference in diameters or clearance of about 0.1 to 0.15 inches is believed suitable (about 2.5 mm to 4 mm). The mesh casing 28 may be flexible and may be bent easily back on itself by hand, using less than 5 pounds force, such as less than two pounds of force to do so. This flexibility allows any portion of the mesh casing 28 to be deflected inward in the event a portion of the mesh casing billows outward from the intumescent ring and does not fit into the base wall 82. Thus, if the mesh casing 28 does not closely conform to the outer contour of the intumescent ring 26, the mesh casing is flexible enough to be squeezed inward so the assembly of the casing and intumescent ring may be fit into the base 30.

The smoke ring 36 may be fastened to the base 30 before or after the fire ring 24, intumescent ring 26 and mesh casing 28 are connected to the base. An adhesive is coated on the outer periphery of the annular smoke ring 36, and the smoke ring is inserted downward through the top end of the sleeve 32 to adhere the smoke ring to the inner surface of the depending lip 86. The smoke ring 36 may be inserted from the bottom of the base 30 and adhered to the depending lip 86, before or after the base 30 is connected to the fire ring 24 and intumescent ring 26. Insertion through the base 30 has a shorter axial distance to move the fire ring 24.

After the above parts are assembled, the fire stop assembly 20 is fastened to the concrete form. The base 30 is fastened to a concrete form, such as by passing fasteners through the fastener holes 46 and into the concrete form or into a suitable bracket that in turn is connected to the concrete form. The cap 34 may be attached to the tubular sleeve 32 before or after the fire stop assembly is fastened to the concrete form, but is fastened before fluid concrete is poured.

After the fire stop assembly 20 is connected to the concrete form and the cap 34 covers the opening of the tubular sleeve 32, wet concrete is poured around the fire stop assembly to entrain the assembly in concrete. The wet concrete is finished by suitable means that will vary with the surface finish desired for the concretes structure. Typically, a vibrator is applied to the wet concrete surface which may further help ensure that air leaves the void space 98 and concrete enters through windows 88 to fill the void space 98 and entrain the fire stop assembly in the concrete. The wet concrete entrains some or all of the mesh casing sidewall 66b and pushes that mesh sidewall against the outer sidewall 60b of the intumescent ring. The top wall 68a and inner sidewall 66a are not entrained in concrete. After the concrete hardens to form the solid concrete structure, the cap 34 is removed and the penetrants such as pipe 38 may be passed through the fire stop assembly 20.

When the penetrant is a metal pipe 38, it is believed suitable to use one or two intumescent rings, each having a small radial thickness so as to create a large void space 98 having a radial thickness 2 to 4 times the total radial thickness of the intumescent ring 26. A thin radial thickness is believed suitable because the metal pipe 38 does not melt during fires and the intumescent material thus need only expand sufficiently during a fire to seal against the outer surface of the metal pipe to block the flow of gas or water through the passage through the concrete structure created by the fire stop assembly 20.

When the penetrant is a plastic pipe 38, it is believed suitable to use three or four concentric rings of intumescent material, possibly more, so the total radial thickness is much greater than with a metal penetrant and so there is little or no void space 98. A single ring 26 of larger radial thickness could be used instead of laying up concentric rings to achieve the desired radial thickness of the intumescent ring. When the intumescent ring 26 fills or substantially fills the space bounded by the base wall 82, the base ledge 84, the depending lip 86, and the fire ring plate 40, the void space 98 may be a radially thin, cylindrical space in fluid communication with the vent openings 50 and windows 88. That way, if insufficient void space 98 is left to allow the fluid, poured concrete particles to fill the thin, cylindrical void space, then smoke may enter the void space 98 and heat the outer (and bottom) surface of the intumescent ring 26 during a fire. A larger radial thickness of the intumescent ring 26 is needed for plastic penetrants because the plastic will normally melt or burn during a fire and thus the intumescent material must expand inward toward axis 22 a much greater distance in order to block the passage through the concrete structure formed by fire stop assembly 20. Concrete enters the void space 98 through windows 88 to encase the outer circumference of the mesh casing 28 (i.e., sidewall 66b) in concrete. Filling the void space 98 with concrete provides a non-flammable, solid outer barrier which directs the expansion of the intumescent ring 26 inward toward the pipe 38 and longitudinal axis 22.

The fire ring 24 may be made of thin, sheet metal, with galvanized steel believed suitable. All parts of the fire ring 24 may be punched out of a continuous, flat sheet of metal with the tabs 42, 44 and 48 bent into a position perpendicular to the plane of the fire ring plate 40 and the central opening and holes 46 punched or cut by forming operations known in the art. Any suitable intumescent material may be used for the intumescent ring 26, including integrally molded rings of the desired size, or wrapped strips forming concentric rings of the desired radial thickness, or stacked rings or concentric strips to form the desired axial height.

Alternatively, or in addition, a gap may be intentionally left between the lateral base ledge 84 and the top 62a of the intumescent ring 26 and the top wall 68*a* of the mesh casing, as long as the depending lip 86 either seals against the inner circumference of the intumescent ring or is immediately adjacent that inner circumference so that little or no wet concrete passes between the depending lip and the top of the intumescent ring. It is believed permissible to allow small amounts of cement to pass through the fire stop assembly 20 into the passage through the fire stop, but even small amounts of concrete are not desirable. Large amounts of concrete could block the passage through the fire stop assembly 20 and even smaller amounts of concrete embedding portions of the fire stop assembly could result in breaking part of the assembly to remove that hardened concrete and allow passage of the pipe 38 through the assembly. Thus, the intumescent ring 26 forms a seal around the circumference of the base 30, between the base ledge 84 at the top of the intumescent ring, and the concrete form that prevents concrete and aggregate in the concrete from entering the passageway formed by the fire stop assembly 20, but that may allow small amounts of cement to leak through. Preventing wet concrete from blocking the passage formed by the fire stop assembly 20 may be achieved by a suitable seal between the intumescent ring 26, mesh casing 28 and the base ledge 84 and/or the depending lip 86 on the top end of the base 30.

The base 30 includes the base flange 80, the base wall 82, the base ledge 84, the depending lip 86, the stiffeners 92 and the legs 90, and the base 30, along with the tubular sleeve 32, may all be formed of a suitable plastic, such as PVC (polyvinylchloride). These parts forming the base 30 and tubular sleeve 32 are injection molded of plastic in a single operation to form a single-piece, integrally molded, unitary plastic part. The openings in the base flange 80 for the fasteners and tabs 44, 48 and the windows 88 are formed during that same molding operation.

The fire stop assembly 20 is believed especially useful with larger diameter sleeves 30, such as from 6 to 12 inches nominal diameter or even larger, where the volume of the intumescent ring 26 is large and it is costly to make and stock housings to accommodate fire rings of different inner and outer diameters. Also, the formation of a concrete ring surrounding some or all of the outer circumference of the fire ring 26 is believed to provide for a stronger passage through the concrete and a more direct support for the inward expansion of the intumescent material during fires. Further, embedding the outer sidewall 66*b* of the mesh casing 28 in the concrete is believed to secure the outer circumference of the mesh casing so the remaining portions of the mesh casing may extend inward toward the longitudinal axis 22, rather than having the mesh casing form an annular covering around only a portion of the expanded intumescent material.

In use, the intumescent ring 26 expands and is believed to carry the mesh casing 28 with the expanding intumescent material forming the ring so the mesh casing extends over a top portion of the expanded intumescent material. By entraining at least a portion of the outer sidewall 66*b* of the mesh casing in concrete, the mesh casing is not pushed up and out of contact with the outer wall of the concrete in the fire stop assembly 20. It is believed that the inner sidewall 66*a* of the mesh casing 28 expands inward and is forced against the pipe 38 by the expanding intumescent material so the mesh casing is fixed around its inner sidewall 66*a* by being forced against the pipe 38, and that can prevent or inhibit the inner side of the mesh casing 28 from being forced upward by the expanding intumescent material and pulled away or pushed away from the pipe 38. If the pipe 38 is plastic it is believed that the mesh casing sidewall 66*a* is initially embedded in the melting plastic that is pushed generally inward and upward by the expanding intumescent material until opposing sides of the inner cylinder of mesh are forced against each other and/or are embedded in the expanded intumescent material so as to form a mesh covering adjacent the top of the expanded material and anchored at the center of the material along the longitudinal axis 22.

In slightly more detail, the heat and smoke from a fire rise upward so the intumescent ring 26 heats from the bottom up, causing the bottom of the intumescent ring 26 to expand before the top portion expands and this is believed to cause the expanding material of the intumescent ring to have a cylindrical outer surface defined by the encasing concrete in the void volume 98, and an inverted conical hole (apex of the cone downward) at the center where the pipe 38 is located. Initially, the heat and smoke from a fire expand the bottom of the intumescent ring 26 and moves the bottom portion of the inner mesh casing sidewall 66*a* toward and against the pipe 38, and expands the bottom of the intumescent ring 26 to push outer mesh casing sidewall 66*b* against the bas 30, case wall 82 and any concrete entraining the intumescent ring 26 through the windows 88.

As the fire continues and the heat increases, it is believed that the middle and top portions of the intumescent ring 26 expand outward to form a cylindrical outer wall again defined by the concrete in the void volume and/or the base wall 82 of the base 80, or even the passage through the concrete structure. It is further believed that the intumescent material 26 also expands inward against the pipe and expands upward between the pipe 38 and the base ledge 84 to result in a conical shape with the apex along the axis 22 toward the top of the concrete structure and assembly 20 The inner mesh casing sidewall 66*a* and top wall 68*a* are believed to allow this expansion as the outer casing sidewall 66*b* is entrained in concrete and thus restrained from moving inward or upward. The inner mesh casing sidewall 66*a* is believed to slide upward along the pipe 38 while also pushing/expanding inward toward the axis 22. Also, the expansion of the intumescent material extrudes some of the material through the mesh. The inner sidewall mesh casing 66*a* and a portion of the top wall mesh casing 68*a* are believed to bend upward and inward—especially the sidewall mesh casing 66*a*. If the pipe is made of plastic (e.g., ABS) and melts, the intumescent fire ring 26 expands further inward and upward until it closes the gap with the compressed sidewalls of pipe 38 or where the pipe was (if it was plastic that melted or burned) and the inner sidewall 66*a* of the mesh casing is forced against itself adjacent the longitudinal axis 22 or is forced against intumescent material that extends through the mesh on the opposing side of the inner sidewall 66*a*. As the intumescent ring 26 expands, the mesh casing 28 is restrained on the outer sidewall but is believed to slide along the pipe 38 upward and inward to form the generally conical shape achieved when the pipe melts and the expanded intumescent ring forms a plug blocking the passage through the fire stop assembly.

Conceptually, it is believed that allowing the inner casing sidewall 66*a* to move while restraining the upper portion of the outer casing sidewall, causes the intumescent ring to bend inward at the upper portion of the intumescent ring 26. The outer mesh casing sidewall 66*b* may be entrained in concrete. But that outer casing sidewall 66*b* could be restrained by fastening it to various portions of the base 30 by various mechanisms, such as adhesive, tape, staples, various mechanical fasteners and clips, hooks molded into the inner facing walls of the base or its base wall 82 or sleeve

32. Any restraint of the outer casing sidewall 62b occurs in the upper half of the sidewall 62b and-closer to or at the top outer casing shoulder 70b.

Because of the inward and upward expansion of the intumescent ring, it is believed desirable that the bottom of the inner mesh casing sidewall 62a is not restrained and thus does not extend underneath the intumescent ring 26, between the fire ring 24 and the fire ring plate 40 as the expanding intumescent ring may bind the bottom of any mesh at that location. The bottom edge of the outer mesh casing sidewall 66b may be folded under the intumescent ring 26, especially if the outer casing sidewall is not restrained by concrete. The restraint against upward movement on the outer mesh casing sidewall 66b may be located closer to the top of the intumescent ring 26 to facilitate the formation of the upward extending conical shape of the expanded intumescent material.

The restraint of the expanded intumescent ring 26 is may be achieved with the outer mesh casing sidewall restrained from upward movement around the entire periphery of the intumescent ring 26. It is believed suitable to have the upward restraint at periodic locations around the periphery so that the outer mesh sidewall 66b can stretch upward and inward between restraint locations. From four to ten restraint locations may be used when they are about equally spaced around the periphery of the intumescent ring 26.

In all of the above fire-induced expansions, the mesh casing 28 is at or adjacent to the top of the expanded intumescent material and has its outer periphery at least partially held in place by being embedded in the concrete in the void volume 98, and has its inner periphery fixed by being wedged against the pipe or the opposing side of the inner casing sidewall 66a by the expanded intumescent material, with intumescent material extruded through the mesh. The mesh casing 28 is believed to strengthen the expanded intumescent plug formed in the passageway through the concrete deck and to enable the expanded intumescent material to withstand being sprayed by a fire hose during a fire. The mesh casing 28 has a large portion of its surface area open and that is believed to allow the intumescent material to extrude through the mesh and entrain at least a portion of the mesh to form a stronger expanded plug of intumescent material than exists without the mesh casing.

Further, the mesh casing 28 is believed to provide improved resistance to loss of expanded intumescent material when a fire hose sprays the intumescent material. For example, the mesh casing 28 encloses the expanded intumescent material and to the extent the fire hose spray breaks up intumescent material the mesh casing helps restrain the broken-up material and confine it within the mesh casing and the presence of the broken-up intumescent material acts as a floating buffer to diffuse the fire hose stream and reduce abrasion of the intact portion of the plug formed by the expanded intumescent material. The result is that a fire stop without the mesh casing 28 can fail a fire rating test while one with the mesh casing can pass the test. As the fire rating tests simulate fire conditions and often simulate worse case fire conditions, a fire stop with the mesh casing is believed to improve the performance of the fire stop during actual use.

Fire rating tests are intended to evaluate the performance of fire stops during simulated fire conditions and such tests use water pressures 30 psi and 45 psi for 1-6 minutes for each 100 square feet of exposed area. For example, for a fire stop with a 2-3 hour fire rating, a concrete structure with a fire stop is fired at 1,600° F. for 3 hours, followed by spraying with a water hose pressure of 30 psi for 2.5 minutes per each 100 square feet of exposed area of the fire stop. Thus, for example, if a 12 inch diameter passage through a concrete structure has a fire stop assembly 20 with a 10.9 inch diameter passage, the area of that 10.9 inch diameter passage is 93.3 square inches or 0.65 square feet so the 2-3 hour fire rating requires spraying with a fire hose at 30 psi for 2.5×100×0.65=65 minutes. The fire stop assembly should not leak after this test.

The above description envisions the outer mesh casing sidewall 66b uniformly entrained in concrete and envisions uniform expansion of the intumescent material. In practice the mesh casing may not be uniformly entrained, and very often the expansion of the intumescent is not uniform such that portions of the outer sidewall 66b of the mesh casing 28 may be pulled out of the concrete. No more than one quarter to one third of a continuous portion of the circumference of the outer mesh casing sidewall 66b pulls loose from the entraining concrete. But as long as enough of the outer sidewall 66b remains held against remains held in place at the outer sidewall where concrete fills the void space 98, the mesh casing 28 is believed to serve its ultimate purpose of extending the life of the plug formed by the intumescent material by reducing damage to the plug caused by water sprayed from the fire hose.

Further, the slits 74 in the mesh casing 28 may result exposing portions of the expanding intumescent material 26 to the fire hose stream. But those slits 74 on the outer sidewall 66b are entrained in concrete that fills the void space 98, and the free edges of those slits 74 helps entrain that mesh casing in the concrete. The slits 74 in the top wall 68a of the mesh casing 28 are adjacent the outer wall of the passage and as the intumescent material 26 expands both upward and inward, at least a portion of the slits 74 in the top wall 68a are pressed against the base wall 82 and any remaining open portions of the slits are believed to be small enough that they do not prevent the functioning of the mesh casing.

The mesh casing 28 may-be formed by hot pressing or drawing a wire screen into the desired shape using mating male and female molds or dies having the configuration of the desired mesh casing so as to conform the shape of the wire screen to the mold/die shape.

While the fire stop assembly is shown as cylindrical, the shape may be of various cross-sectional shapes, including rectangular shapes and other polygons, and including other curved cross-sections, including elliptical cross sections. The fire stop assembly 20 comprises a tube, as the penetrant or pipe 38 passes through the passage formed within the assembly 20 along which the longitudinal axis 22 extends. The base 30 (and its sleeve 32 and flange 85 and stiffeners 92) is of molded plastic, such as ABS plastic. The base 30 may be injection molded to create an integrally formed base formed of a single, unitary material without having parts affixed by other mechanisms at later dates. While the fire stop assembly 20 is depicted with the windows 88 extending through the top portion of the base wall 82 with a vertical opening through the base ledge 84, the windows 88 could extend all the way to the base flange 81 or even extend into the base ledge. Thus, the openings formed by the windows 88 may be of various shapes and locations to allow wet concrete to enter the base 30 and entrain at least a portion of the intumescent ring 26 in concrete.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The above description is given by way of example, and not limitation. Given the above disclosure, one skilled in the art could devise variations that are within the scope and spirit of the invention, including various ways of fastening the fire ring 24 to the base 30, and of fastening the cap 34 to the tubular sleeve 32. Further, the various features of this invention can be used alone, or in varying combinations with each other and are not intended to be limited to the specific combination described herein. Thus, the invention is not to be limited by the illustrated embodiments.

What is claimed is:

1. A tubular fire stop assembly defining a passage, the assembly embedded in a poured concrete structure during use, comprising:
   a base encircling and extending along the passage, the base having a tubular sleeve that also encircles and extends along the passage;
   a fire ring connected to the base and having a fire ring plate with a central opening encircling the passage, the fire ring having an inner circumference, the fire ring plate including a plurality of positioning tabs at the inner circumference of the fire ring, wherein the plurality of positioning tabs extends perpendicularly relative to the fire ring plate such that the plurality of positioning tabs encircles the central opening of the fire ring plate;
   an intumescent ring having an inner and outer sidewall and opposing top and bottom walls extending between the inner and outer sidewalls, the intumescent ring located on the fire ring plate inside the base and encircling the passage; and
   a mesh casing extending along the inner and outer sidewalls and the top wall of the intumescent ring and encircling the passage.

2. The tubular fire stop assembly of claim 1, wherein the mesh casing is made of a material that does not melt or combust or decompose when held at a temperature of up to 1,600° F. for at least 1.5 hours.

3. The tubular fire stop assembly of claim 2, wherein the mesh casing extends along and encloses at least half of the surf ace areas of the inner and outer sidewalls and the top wall of the intumescent ring.

4. The tubular fire stop assembly of claim 3, wherein the mesh casing is connected to the base at a location at or above an upper half of the intumescent ring, at locations around a majority of a periphery of the base.

5. The tubular fire stop assembly of claim 3, wherein the mesh casing comprises a woven, galvanized steel wire mesh.

6. The tubular fire stop assembly of claim 3, wherein the mesh casing has a plurality of slits in the portion of the mesh casing extending over the top wall and outer sidewall of the intumescent ring.

7. The tubular fire stop assembly of claim 3, wherein the mesh casing is cylindrical and is entrained in concrete around at least a majority of a circumference of that outer sidewall.

8. The tubular fire stop assembly of claim 3, wherein a ledge extends inward from the base and encircles the passage with the intumescent ring located between the fire ring plate and the ledge.

9. The tubular fire stop assembly of claim 8, wherein the ledge has a depending lip encircling the passage and contacting the mesh casing.

10. The tubular fire stop assembly of claim 3, wherein the base and intumescent ring cooperate to define a space between the outer sidewall of the intumescent ring and an outer wall of the base encircling the outer sidewall of the intumescent ring; and wherein the base has a plurality of windows located and sized so that space is in fluid communication with the windows so that concrete can enter that space through the windows.

11. The tubular fire stop assembly of claim 10, wherein the tubular fire stop assembly is entrained in concrete which extends through the plurality of windows.

12. The tubular fire stop assembly of claim 1, wherein the base has a plurality of windows around a majority of a periphery of the base with the windows being large enough that concrete can enter and entrain the base in concrete during use.

13. The tubular fire stop assembly of claim 1, further comprising a base flange extending outward and having a plurality of fastener openings, the base flange having two parallel sides.

14. The tubular fire stop assembly of claim 1, further including a smoke ring connected to the base and encircling the passage, the smoke ring having an inner periphery sized to engage an outer circumference of a tubular penetrant extending through the tubular fire stop assembly during use.

15. The tubular fire stop assembly of claim 1, wherein the mesh casing comprises a woven, galvanized steel wire mesh.

16. A tubular fire stop assembly defining a passage, the assembly embedded in a poured concrete structure during use, comprising:
   a base encircling and extending along the passage, the base having a tubular sleeve that also encircles and extends along the passage;
   a fire ring connected to the base and having a fire ring plate with a central opening encircling the passage;
   an intumescent ring having an inner and outer sidewall and opposing top and bottom walls extending between the inner and outer sidewalls, the intumescent ring located on the fire ring plate inside the base and encircling the passage; and
   a mesh casing extending along the inner and outer sidewalls and the top wall of the intumescent ring and encircling the passage;
   wherein the mesh casing is made of a material that does not melt or combust or decompose when held at a temperature of up to 1,600° F. for at least 1.5 hours;
   wherein the mesh casing extends along and encloses at least half of the surf ace areas of the inner and outer sidewalls and the top wall of the intumescent ring; and
   wherein the base and intumescent ring cooperate to define a space between the outer sidewall of the intumescent ring and an outer wall of the base encircling the outer sidewall of the intumescent ring; and wherein the base has a plurality of windows located and sized so that space is in fluid communication with the windows so that concrete can enter that space through the windows.

\* \* \* \* \*